(12) United States Patent
Clark

(10) Patent No.: US 11,007,673 B2
(45) Date of Patent: *May 18, 2021

(54) METHODS FOR MANUFACTURING BULKED CONTINUOUS FILAMENT FROM COLORED RECYCLED PET

(71) Applicant: Aladdin Manufacturing Corporation, Calhoun, GA (US)

(72) Inventor: Thomas R. Clark, Chattanooga, TN (US)

(73) Assignee: Aladdin Manufacturing Corporation, Calhoun, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/537,844

(22) Filed: Aug. 12, 2019

(65) Prior Publication Data

US 2019/0360122 A1 Nov. 28, 2019

Related U.S. Application Data

(60) Continuation of application No. 15/419,955, filed on Jan. 30, 2017, now Pat. No. 10,487,422, which is a
(Continued)

(51) Int. Cl.
*D02G 3/24* (2006.01)
*B29B 7/48* (2006.01)
(Continued)

(52) U.S. Cl.
CPC ............ *B29B 7/485* (2013.01); *B29B 17/00* (2013.01); *B29B 17/0042* (2013.01);
(Continued)

(58) Field of Classification Search
CPC .............. B29B 9/02; B29B 2013/002; B29B 2013/005; B29B 2017/0015; B29B 17/04;
(Continued)

(56) References Cited

U.S. PATENT DOCUMENTS 1,490,918 A 4/1924 Gaede
2,146,532 A 2/1939 Crane
(Continued)

FOREIGN PATENT DOCUMENTS

AU 2013267847 3/2014
AU 2014215998 9/2014
(Continued)

OTHER PUBLICATIONS

International Preliminary Report on Patentability, dated Sep. 12, 2019, from corresponding International Application No. PCT/US2018/020746.
(Continued)

*Primary Examiner* — Leo B Tentoni
(74) *Attorney, Agent, or Firm* — Brient IP Law, LLC

(57) ABSTRACT

A method of manufacturing bulked continuous carpet filament which, in various embodiments, comprises: (A) grinding recycled PET bottles into a group of flakes; (B) washing the flakes; (C) identifying and removing impurities, including impure flakes, from the group of flakes; (D) adding one or more color concentrates to the flakes; (E) passing the group of flakes through an extrusion system while maintaining the pressure within the extrusion system below about 25 millibars; (F) passing the resulting polymer melt through at least one filter having a micron rating of less than about 50 microns; and (G) forming the recycled polymer into bulked continuous carpet filament that consists essentially of recycled PET.

22 Claims, 5 Drawing Sheets

Related U.S. Application Data continuation-in-part of application No. 15/396,143, filed on Dec. 30, 2016, now Pat. No. 10,493,660, which is a continuation of application No. 13/892,713, filed on May 13, 2013, now Pat. No. 9,550,338, which is a division of application No. 13/721,955, filed on Dec. 20, 2012, now Pat. No. 8,597,553.

(60) Provisional application No. 61/654,016, filed on May 31, 2012.

(51) Int. Cl.

| | | |
|---|---|---|
| *D01D 5/08* | (2006.01) | |
| *D01F 6/62* | (2006.01) | |
| *D01D 1/10* | (2006.01) | |
| *B29B 17/00* | (2006.01) | |
| *B29B 17/02* | (2006.01) | |
| *C08J 11/04* | (2006.01) | |
| *C08J 11/06* | (2006.01) | |
| *D01D 1/04* | (2006.01) | |
| *D01D 1/06* | (2006.01) | |
| *B29C 48/92* | (2019.01) | |
| *B29C 48/05* | (2019.01) | |
| *B29C 48/29* | (2019.01) | |
| *B29C 48/275* | (2019.01) | |
| *B29C 48/285* | (2019.01) | |
| *B29C 48/435* | (2019.01) | |
| *B29C 48/38* | (2019.01) | |
| *B29C 48/44* | (2019.01) | |
| *B29C 48/40* | (2019.01) | |
| B29B 13/00 | (2006.01) | |
| B29K 105/00 | (2006.01) | |
| B29K 67/00 | (2006.01) | |
| B29K 105/26 | (2006.01) | |
| D01F 1/06 | (2006.01) | |
| D01F 6/92 | (2006.01) | |
| B29C 48/14 | (2019.01) | |
| B29C 48/17 | (2019.01) | |
| B29C 48/25 | (2019.01) | |
| B29C 48/385 | (2019.01) | |
| B29C 48/76 | (2019.01) | |
| B29C 48/43 | (2019.01) | |

(52) U.S. Cl.
CPC .............. *B29B 17/02* (2013.01); *B29C 48/05* (2019.02); *B29C 48/277* (2019.02); *B29C 48/287* (2019.02); *B29C 48/29* (2019.02); *B29C 48/38* (2019.02); *B29C 48/40* (2019.02); *B29C 48/435* (2019.02); *B29C 48/44* (2019.02); *B29C 48/92* (2019.02); *C08J 11/04* (2013.01); *C08J 11/06* (2013.01); *D01D 1/04* (2013.01); *D01D 1/065* (2013.01); *D01D 1/103* (2013.01); *D01D 1/106* (2013.01); *D01D 5/08* (2013.01); *D01F 6/62* (2013.01); *B29B 2013/002* (2013.01); *B29B 2013/005* (2013.01); *B29B 2017/0015* (2013.01); *B29B 2017/0224* (2013.01); *B29C 48/144* (2019.02); *B29C 48/17* (2019.02); *B29C 48/268* (2019.02); *B29C 48/286* (2019.02); *B29C 48/385* (2019.02); *B29C 48/43* (2019.02); *B29C 48/766* (2019.02); *B29C 2948/922* (2019.02); *B29C 2948/92257* (2019.02); *B29C 2948/92514* (2019.02); *B29C 2948/92876* (2019.02); *B29K 2067/003* (2013.01); *B29K 2105/0067* (2013.01); *B29K 2105/26* (2013.01); *C08J 2367/02* (2013.01); *D01F 1/06* (2013.01); *D01F 6/92* (2013.01); *D10B 2331/04* (2013.01); *D10B 2503/04* (2013.01); *Y02P 20/143* (2015.11); *Y02P 70/10* (2015.11); *Y02W 30/62* (2015.05)

(58) Field of Classification Search
CPC .... B29B 2017/0424; B29B 2017/0468; B29C 37/006; B29C 48/268; B29C 48/38; B29C 48/385; B29C 48/425; B29C 48/43; B29C 48/435; B29C 48/69; B29C 48/695; B29C 48/70; B29C 48/71; B29C 48/766; B29C 49/92; B29C 2948/92257; B29C 2948/92514; B29C 2948/92876; B29K 2067/00; B29K 2067/003; B29K 2105/0067; B29K 2105/26; C08J 11/04; C08J 11/06; C08J 2367/02; D01D 1/103; D01D 1/106; D01D 5/08; D01F 1/06; D01F 6/62; D02G 3/24; D10B 2331/04; D10B 2503/04
USPC ........ 264/40.1, 78, 101, 102, 140, 141, 142, 264/143, 169, 176.1, 211.21, 211.22, 264/211.23, 331.21, 918
See application file for complete search history.

(56) References Cited

U.S. PATENT DOCUMENTS

| | | |
|---|---|---|
| 3,217,783 A | 11/1965 | Rodenacker |
| 3,310,837 A | 3/1967 | Wittrock |
| 3,357,049 A | 12/1967 | Spindler |
| 3,608,001 A | 9/1971 | Kowalski et al. |
| 3,825,236 A | 7/1974 | Hussmann et al. |
| 3,865,528 A | 2/1975 | Roess |
| 3,938,924 A | 2/1976 | Abella et al. |
| 4,057,376 A | 11/1977 | Berger |
| 4,057,607 A | 11/1977 | Soehngen et al. |
| 4,128,386 A | 12/1978 | Wissinger et al. |
| 4,172,477 A | 10/1979 | Reich |
| 4,192,617 A | 3/1980 | Spielhoff |
| 4,268,176 A | 5/1981 | Muller |
| 4,269,798 A | 5/1981 | Ives |
| 4,272,475 A * | 6/1981 | Chi ...................... B29C 48/022 264/210.1 |
| 4,289,409 A | 9/1981 | Brand |
| 4,370,302 A | 1/1983 | Suzuoka et al. |
| 4,564,349 A | 1/1986 | Brown |
| 4,591,487 A | 5/1986 | Fritsch |
| 4,919,872 A | 4/1990 | Fintel |
| 5,102,594 A | 4/1992 | Burlet et al. |
| 5,108,711 A | 4/1992 | Chszaniecki |
| 5,143,308 A | 9/1992 | Hally et al. |
| 5,224,383 A | 7/1993 | Pinto et al. |
| 5,225,130 A | 7/1993 | Deiringer |
| 5,266,601 A | 11/1993 | Kyber et al. |
| 5,306,803 A | 4/1994 | Arlt et al. |
| 5,393,140 A | 2/1995 | Blach |
| 5,424,013 A | 6/1995 | Lieberman |
| 5,427,881 A | 6/1995 | Sacripante et al. |
| 5,459,168 A | 10/1995 | Nasr et al. |
| 5,497,562 A | 3/1996 | Pikus |
| 5,503,788 A | 4/1996 | Lazareck et al. |
| 5,510,073 A | 4/1996 | Kaegi et al. |
| 5,532,035 A | 7/1996 | Corbin et al. |
| 5,549,957 A | 8/1996 | Negola et al. |
| 5,554,657 A | 9/1996 | Brownscombe et al. |
| 5,613,285 A | 3/1997 | Chester et al. |
| 5,623,012 A | 4/1997 | Hwo |
| 5,715,584 A | 2/1998 | Coons, III et al. |
| 5,804,115 A | 9/1998 | Burton et al. |
| 5,836,682 A | 11/1998 | Blach |
| 5,886,058 A | 3/1999 | Van Erden et al. |
| 5,893,702 A | 4/1999 | Conrad et al. |
| 5,932,691 A | 8/1999 | Khanin et al. |
| 5,945,215 A | 8/1999 | Bersted et al. |

(56) References Cited

U.S. PATENT DOCUMENTS

| | | |
|---|---|---|
| 5,951,159 A | 9/1999 | Schobert-Csongor et al. |
| 5,958,548 A | 9/1999 | Negola et al. |
| 5,961,054 A | 10/1999 | Nishibori |
| 6,007,892 A | 12/1999 | Harwood et al. |
| 6,074,084 A | 6/2000 | Kolossow |
| 6,113,825 A | 9/2000 | Chuah |
| 6,265,533 B1 | 7/2001 | Regel et al. |
| 6,394,644 B1 | 5/2002 | Streiff |
| 6,492,485 B1 | 12/2002 | Gohr et al. |
| 6,620,354 B1 | 9/2003 | Bessemer et al. |
| 6,627,127 B1 | 9/2003 | Piovoso et al. |
| 6,722,117 B2 | 4/2004 | Belcher, Jr. et al. |
| 6,773,718 B2 | 8/2004 | Seth et al. |
| 6,780,941 B2 | 8/2004 | Studholme et al. |
| 6,784,214 B1 | 8/2004 | Bacher et al. |
| 6,852,256 B2 | 2/2005 | Borer et al. |
| 6,866,171 B2 | 3/2005 | Ickinger |
| 6,984,694 B2 | 1/2006 | Blasius, Jr. et al. |
| 7,025,491 B2 | 4/2006 | Blach et al. |
| 7,192,545 B2 | 3/2007 | Ekart et al. |
| 7,198,400 B2 | 4/2007 | Unterlander et al. |
| 7,204,945 B2 | 4/2007 | Bonner |
| 7,262,380 B1 | 8/2007 | Ulrichsen et al. |
| 7,320,589 B2 | 1/2008 | Babin et al. |
| 7,354,988 B2 | 4/2008 | Charati et al. |
| 7,380,973 B2 | 6/2008 | Goedicke et al. |
| 7,485,685 B2 | 2/2009 | Mihan et al. |
| 7,513,677 B2 | 4/2009 | Gneuss et al. |
| 7,594,453 B2 | 9/2009 | Blach |
| 7,628,892 B2 | 12/2009 | Fini |
| 7,654,725 B2 | 2/2010 | Sturm et al. |
| 7,700,015 B2 | 4/2010 | Kern et al. |
| 7,744,788 B2 | 6/2010 | Portier et al. |
| 7,799,835 B2 | 9/2010 | Smith et al. |
| 7,828,538 B2 | 11/2010 | Fellinger |
| 7,902,262 B2 | 3/2011 | Armstrong et al. |
| 7,935,737 B2 | 5/2011 | Gopal et al. |
| 7,980,834 B2 | 7/2011 | Maguire |
| 8,080,190 B2 | 12/2011 | Ichikawa et al. |
| 8,147,738 B2 | 4/2012 | Boczon et al. |
| 8,187,512 B2 | 5/2012 | Eloo et al. |
| 8,398,752 B2 | 3/2013 | Brownstein et al. |
| 8,404,755 B2 | 3/2013 | Sequeira |
| 8,444,886 B2 | 5/2013 | Herve |
| 8,471,972 B2 | 6/2013 | Tsubata |
| 8,557,155 B2 | 10/2013 | Deiss et al. |
| 8,597,553 B1 | 12/2013 | Clark |
| 8,735,457 B2 | 5/2014 | Booth et al. |
| 8,741,972 B2 | 6/2014 | Booth et al. |
| 8,795,811 B2 | 8/2014 | Cloutier et al. |
| 9,061,442 B2 | 6/2015 | Gneuss et al. |
| 9,149,955 B2 | 10/2015 | Bower et al. |
| 9,168,718 B2 | 10/2015 | Westwood et al. |
| 9,409,363 B2 | 8/2016 | Clark |
| 9,550,338 B2 | 1/2017 | Clark |
| 9,630,353 B2 | 4/2017 | Clark |
| 9,630,354 B2 | 4/2017 | Clark |
| 9,636,845 B2 | 5/2017 | Clark |
| 9,636,860 B2 | 5/2017 | Clark |
| 9,908,263 B2 | 3/2018 | Pichler et al. |
| 9,975,278 B2 | 5/2018 | Rabiser et al. |
| 10,124,513 B2 | 11/2018 | Clark |
| 10,532,495 B2 | 1/2020 | Clark |
| 2002/0086077 A1 | 7/2002 | Noller et al. |
| 2004/0053047 A1 | 3/2004 | Jackson et al. |
| 2004/0082672 A1 | 4/2004 | Zeng et al. |
| 2004/0140248 A1 | 7/2004 | Dauzvardis et al. |
| 2004/0155374 A1 | 8/2004 | Hutchinson et al. |
| 2005/0047267 A1 | 3/2005 | Gneuss et al. |
| 2005/0263941 A1 | 12/2005 | Reutter et al. |
| 2006/0012074 A1 | 1/2006 | Booth et al. |
| 2006/0076705 A1 | 4/2006 | Fowler et al. |
| 2006/0284334 A1 | 12/2006 | Christel |
| 2007/0000947 A1 | 1/2007 | Lewis et al. |
| 2007/0052131 A1 | 3/2007 | Fujimaki et al. |
| 2007/0261777 A1 | 11/2007 | Steckelberg et al. |
| 2008/0004202 A1 | 1/2008 | Wolfgang et al. |
| 2008/0069916 A1 | 3/2008 | Regalia |
| 2008/0139700 A1 | 6/2008 | Roden et al. |
| 2008/0157425 A1 | 7/2008 | Rodgers et al. |
| 2008/0214701 A1 | 9/2008 | Wilms et al. |
| 2008/0272508 A1 | 11/2008 | Culbert et al. |
| 2008/0274320 A1 | 11/2008 | Yokoyama et al. |
| 2008/0292831 A1 | 11/2008 | Juriga et al. |
| 2009/0004325 A1 | 1/2009 | Bacher et al. |
| 2009/0039542 A1 | 2/2009 | Morton-Finger |
| 2009/0270564 A1 | 10/2009 | Gorlier et al. |
| 2009/0286919 A1 | 11/2009 | Moller et al. |
| 2010/0102475 A1 | 4/2010 | Moon et al. |
| 2010/0113626 A1 | 5/2010 | Liu |
| 2011/0177283 A1 | 7/2011 | Juriga |
| 2011/0257345 A1 | 10/2011 | Hoover, Jr. et al. |
| 2012/0070615 A1 | 3/2012 | Shi et al. |
| 2012/0279023 A1 | 11/2012 | Burout et al. |
| 2015/0069652 A1 | 3/2015 | Clark |
| 2015/0069655 A1 | 3/2015 | Clark |
| 2015/0076725 A1 | 3/2015 | Clark |
| 2015/0076744 A1 | 3/2015 | Clark |
| 2017/0136761 A1 | 5/2017 | Sieradzki et al. |
| 2017/0152611 A1 | 6/2017 | Clark |
| 2017/0275785 A1 | 9/2017 | Williams et al. |
| 2018/0126595 A1 | 5/2018 | Clark |
| 2018/0127893 A1 | 5/2018 | Clark |
| 2018/0362723 A1 | 12/2018 | Gneuss et al. |
| 2020/0055213 A1 | 2/2020 | Clark |

FOREIGN PATENT DOCUMENTS

| | | |
|---|---|---|
| CH | 170967 A | 8/1934 |
| CN | 1391511 | 1/2003 |
| CN | 101444954 | 6/2009 |
| CN | 101778705 | 7/2010 |
| CN | 201872322 | 6/2011 |
| CN | 202072825 | 12/2011 |
| CN | 102990903 | 3/2013 |
| CN | 104040040 | 9/2014 |
| CN | 204265905 | 4/2015 |
| DE | 2243024 A1 | 3/1973 |
| DE | 3801574 | 8/1989 |
| DE | 4433593 | 6/1995 |
| DE | 19722278 | 12/1998 |
| DE | 102006033089 | 10/2007 |
| DE | 102008018686 | 10/2009 |
| DE | 102011082769 | 3/2013 |
| DE | 102013000316 | 7/2014 |
| DE | 102017111275 | 11/2018 |
| EP | 0336520 | 10/1989 |
| EP | 0846860 A2 | 6/1998 |
| EP | 0881054 | 12/1998 |
| EP | 1054083 | 11/2000 |
| EP | 1400332 | 3/2004 |
| EP | 1434680 | 7/2006 |
| EP | 2748358 | 7/2014 |
| EP | 3375916 | 9/2018 |
| GB | 2059864 | 4/1981 |
| GB | 1601699 | 11/1981 |
| GB | 2141844 | 1/1985 |
| JP | 63191823 | 8/1988 |
| JP | 2003530478 | 10/2003 |
| JP | 2007186830 | 7/2007 |
| WO | 2001021373 | 3/2001 |
| WO | 2002038276 | 5/2002 |
| WO | 2003033240 | 4/2003 |
| WO | 2004026557 | 4/2004 |
| WO | 2008017843 | 2/2008 |
| WO | 2008083035 | 7/2008 |
| WO | 2008083820 | 7/2008 |
| WO | 2010133531 | 11/2010 |
| WO | 2011088437 | 7/2011 |
| WO | 2011095361 | 8/2011 |
| WO | 2012119165 | 9/2012 |
| WO | 2013180941 | 12/2013 |
| WO | 2016081474 | 5/2016 |
| WO | 2016081495 | 5/2016 |

(56) References Cited

FOREIGN PATENT DOCUMENTS

| WO | 2016081508 | 5/2016 |
|----|------------|--------|
| WO | 2016081568 | 5/2016 |
| WO | 2018089346 | 5/2018 |
| WO | 2018140884 | 8/2018 |
| WO | 2018161021 | 9/2018 |

OTHER PUBLICATIONS

Office Action, dated Sep. 12, 2019, from corresponding U.S. Appl. No. 16/432,579.
Notice of Allowance, dated Oct. 10, 2019, from corresponding U.S. Appl. No. 16/432,579.
Notice of Allowance, dated Oct. 28, 2013, from corresponding U.S. Appl. No. 13/721,955.
Notice of Allowance, dated Sep. 12, 2016, from corresponding U.S. Appl. No. 13/892,713.
Notice of Opposition, dated Dec. 17, 2015, from corresponding European Application No. 13728264.6.
Office Action, dated Apr. 9, 2018, from corresponding U.S. Appl. No. 15/204,645.
Office Action, dated Aug. 21, 2015, from corresponding U.S. Appl. No. 14/256,261.
Office Action, dated Aug. 27, 2018, from corresponding U.S. Appl. No. 15/473,385.
Office Action, dated Aug. 27, 2018, from corresponding U.S. Appl. No. 15/473,402.
Office Action, dated Jul. 23, 2019, from corresponding U.S. Appl. No. 16/041,442.
Office Action, dated Jun. 1, 2016, from corresponding U.S. Appl. No. 14/546,837.
Office Action, dated Jun. 10, 2013, from corresponding U.S. Appl. No. 13/721,955.
Office Action, dated Jun. 13, 2016, from corresponding U.S. Appl. No. 14/546,847.
Office Action, dated Jun. 18, 2019, from corresponding U.S. Appl. No. 16/402,583.
Office Action, dated Jun. 22, 2016, from corresponding U.S. Appl. No. 14/546,796.
Office Action, dated Jun. 30, 2016, from corresponding U.S. Appl. No. 13/892,740.
Office Action, dated Mar. 24, 2016, from corresponding U.S. Appl. No. 13/892,713.
Office Action, dated May 26, 2016, from corresponding U.S. Appl. No. 14/546,819.
Office Action, dated May 6, 2019, from corresponding U.S. Appl. No. 15/348,591.
Office Action, dated Oct. 9, 2018, from corresponding U.S. Appl. No. 15/419,955.
Office Action, dated Sep. 7, 2018, from corresponding U.S. Appl. No. 15/396,143.
Restriction Requirement, dated Apr. 30, 2013, from corresponding U.S. Appl. No. 13/721,955.
Restriction Requirement, dated Feb. 5, 2019, from corresponding U.S. Appl. No. 16/220,733.
Restriction Requirement, dated Jul. 15, 2019, from corresponding U.S. Appl. No. 16/432,579.
Schiefer,Process Engineering, Rowohlt Taschenbuch Verlag GmbH, Aug. 1972.
Vietnamese Office Action, dated Jul. 13, 2016, from corresponding Vietnamese Patent Application No. 1-2014-01079.
Wikipedia, Polyethylene terephthalate, https://en.wikipedia.org/w/index.php?title=Polyethylene_terephthalate&oldid=491494734.
Written Opinion of the International Searching Authority, dated Apr. 12, 2018, from corresponding International Application No. PCT/US2018/015751.
Written Opinion of the International Searching Authority, dated Feb. 2, 2016, from corresponding International Application No. PCT/US2015/061116.
Written Opinion of the International Searching Authority, dated Feb. 2, 2016, from corresponding International Application No. PCT/US2015/061145.
Written Opinion of the International Searching Authority, dated Feb. 5, 2016, from corresponding International Application No. PCT/US2015/061174.
Written Opinion of the International Searching Authority, dated Jan. 20, 2016, from corresponding International Application No. PCT/US2015/061288.
Written Opinion of the International Searching Authority, dated Mar. 1, 2018, from corresponding International Application Serial No. PCT/US2017/060359.
Written Opinion of the International Searching Authority, dated Nov. 19, 2018, from corresponding International Application No. PCT/US2018/051043.
Written Opinion of the International Searching Authority, dated Sep. 2, 2013, from corresponding International Application No. PCT/US2013/040753.
Office Action, dated Aug. 8, 2019, from corresponding U.S. Appl. No. 16/409,599.
International Preliminary Report on Patentability, dated Aug. 8, 2019, from corresponding International Application No. PCT/US2018/015751.
Office Action, dated Aug. 13, 2019, from corresponding U.S. Appl. No. 16/213,694.
Botos, J., et al., "Color Measurement of Plastics—from Compounding via Pelletizing, up to Injection Molding and Extrusion," AIP Conference Proceedings 1593, 16 (2014), https://doi.org/10.1063/1.4873725, Feb. 17, 2015.
Machado, Almir De Souza, "Fundamentals of Cast Film Extrusion Technology," https://www.slideshare.net/ASMachado/fundamentals-of-cast-film-extrusion-technology, Dec. 2, 2013.
Notice of Allowance, dated Aug. 19, 2019, from corresponding U.S. Appl. No. 16/402,583.
Office Action, dated Aug. 26, 2019, from corresponding U.S. Appl. No. 16/220,905.
"MRS extrusion technology offers new options in PET", Plastics Additives and Compounding, Elsevier Science, Oxofrd, GB, vol. 11, No. 2, Mar. 1, 2009 (Mar. 1, 2009), pp. 24-26, XP026067788, ISSN: 1464-391X. DOI:10.1016/S1464-391X(09)70050-9 [retrieved on Mar. 1, 2009] the whole document.
"Processing Technology: Processing of Polymer Melts," Oct. 31, 2007, Gneuss Kunststoffechnik GmbH, Dusseldorf, Germany.
Australian Office Action, dated Aug. 26, 2015, from corresponding Australian Patent Application No. 2014215998.
Australian Office Action, dated Dec. 5, 2016, from corresponding Australian Patent Application No. 2016234917.
Australian Office Action, dated May 9, 2014, from corresponding Australian Patent Application No. 2013267847.
Chinese Office Action, dated May 12, 2016, from corresponding Chinese Patent Application No. 201380003461.8.
Chinese Office Action, dated Sep. 14, 2015, from corresponding Chinese Patent Application No. 201380003461.8.
Decision of Patent Grant, dated Dec. 12, 2014, from corresponding Korean Patent Application No. 10-2014-7016621.
European Office Action, dated Dec. 12, 2016, from corresponding European Patent Application No. 15158377.0.
Ex Parte Quayle Action, dated Mar. 11, 2019, from corresponding U.S. Appl. No. 16/220,733.
Extended European Search Report, dated Aug. 26, 2015, from corresponding European Application No. 15158377.0.
Extended European Search Report, dated Jul. 24, 2018, from corresponding European Patent Application No. 18170112.9.
Final Office Action, dated Dec. 24, 2015, from corresponding U.S. Appl. No. 14/256,261.
Final Office Action, dated May 22, 2019, from corresponding U.S. Appl. No. 15/396,143.
Final Office Action, dated Oct. 19, 2016, from corresponding U.S. Appl. No. 14/546,819.
Final Office Action, dated Oct. 19, 2016, from corresponding U.S. Appl. No. 14/546,837.
Final Office Action, dated Oct. 19, 2016, from corresponding U.S. Appl. No. 14/546,847.

(56) References Cited

OTHER PUBLICATIONS

Final Office Action, dated Oct. 20, 2016, from corresponding U.S. Appl. No. 14/546,796.
Gneuss M: "Multi Rotation System Extruder Leads to Breakthrough in Polymer Evacuation", International Fiber Journal, International Media Group, Charlotte, NC, US, vol. 23, No. 1, Feb. 1, 2008 (Feb. 1, 2008), pp. 40-41, XP001514827, ISSN: 1049-801X the whole document.
Hannemann, Innovative Aufbereitungslösung für PET mit uneingeschrankter FDA—Lebensmittelzulassung, Presentation, Mar. 15, 2012, 37 pages total, Gneuss Kunststofftechnik GmbH, Germany.
International Preliminary Report on Patentability, dated Dec. 11, 2014, from corresponding International Application No. PCT/US2013/040753.
International Preliminary Report on Patentability, dated Dec. 2, 2014, from corresponding International Application No. PCT/US2013/040753.
International Preliminary Report on Patentability, dated Jun. 1, 2017, from corresponding International Application No. PCT/US2015/061116.
International Preliminary Report on Patentability, dated Jun. 1, 2017, from corresponding International Application No. PCT/US2015/061145.
International Preliminary Report on Patentability, dated Jun. 1, 2017, from corresponding International Application No. PCT/US2015/061174.
International Preliminary Report on Patentability, dated Jun. 1, 2017, from corresponding International Application No. PCT/US2015/061288.
International Search Report, dated Apr. 12, 2018, from corresponding International Application No. PCT/US2018/015751.
International Search Report, dated Feb. 2, 2016, from corresponding International Application No. PCT/US2015/061116.
International Search Report, dated Feb. 2, 2016, from corresponding International Application No. PCT/US2015/061145.
International Search Report, dated Feb. 5, 2016, from corresponding International Application No. PCT/US2015/061174.
International Search Report, dated Jan. 20, 2016, from corresponding International Application No. PCT/US2015/061288.
International Search Report, dated Mar. 1, 2018, from corresponding International Application Serial No. PCT/US2017/060359.
International Search Report, dated Nov. 19, 2018, from corresponding International Application No. PCT/US2018/051043.
International Search Report, dated Sep. 2, 2013, from corresponding International Application No. PCT/US2013/040753.
Invitation to Pay Additional Search Fees, dated Jan. 5, 2018, from corresponding International Application Serial No. PCT/US2017/060359.
Jaecker M: "The Conceptual Concept of the Future // Advantages of the Negative-Conical Gangti Efe on Double-Screw Extruders", Kunststoffe, Carl Hanser Verlag, Munchen, DE, vol. 99, No. 12, Dec. 1, 2000 (Dec. 91, 2000), p. 64,66, XP990976191, ISSN: 9923-5563, figure 1.
Korean Office Action, dated Aug. 18, 2014, from corresponding Korean Patent Application No. 10-2014-7016621.
Notice of Acceptance, dated Jun. 21, 2016, from corresponding Australian Patent Application No. 2014215998.
Notice of Acceptance, dated Nov. 10, 2014, from corresponding Australian Patent Application No. 2013267847.
Notice of Allowance, dated Apr. 13, 2016, from corresponding U.S. Appl. No. 14/256,261.
Notice of Allowance, dated Apr. 17, 2019, from corresponding U.S. Appl. No. 16/220,733.
Notice of Allowance, dated Aug. 1, 2019, from corresponding U.S. Appl. No. 15/396,143.
Notice of Allowance, dated Dec. 13, 2018, from corresponding U.S. Appl. No. 15/473,385.
Notice of Allowance, dated Feb. 2, 2017, from corresponding U.S. Appl. No. 14/546,819.
Notice of Allowance, dated Feb. 2, 2017, from corresponding U.S. Appl. No. 14/546,837.
Notice of Allowance, dated Feb. 2, 2017, from corresponding U.S. Appl. No. 14/546,847.
Notice of Allowance, dated Feb. 3, 2017, from corresponding U.S. Appl. No. 14/546,796.
Notice of Allowance, dated Jan. 24, 2019, from corresponding U.S. Appl. No. 15/473,402.
Notice of Allowance, dated Jul. 5, 2018, from corresponding U.S. Appl. No. 15/204,645.
Notice of Allowance, dated May 1, 2019, from corresponding U.S. Appl. No. 15/419,955.
Notice of Allowance, dated Feb. 12, 2020, from corresponding U.S. Appl. No. 16/220,905.
Office Action, dated Feb. 21, 2020, from corresponding U.S. Appl. No. 15/910,853.
Notice of Allowance, dated Feb. 28, 2020, from corresponding U.S. Appl. No. 16/664,730.
Notice of Allowance, dated Mar. 3, 2020, from corresponding U.S. Appl. No. 16/213,694.
"MRS extrusion technology offers new options in PET", Plastics Additives and Compounding, Elsevier Science, Oxofrd, GB, vol. 11, No. 2, Mar. 1, 2009 (Mar. 1, 2009), pp. 24-26, XP026067788, ISSN: 1464-391X. DOI:10.1016/51464-391X(09)70050-9 [retrieved on Mar. 1, 2009] the whole document.
Notice of Allowance, dated Apr. 29, 2020, from corresponding U.S. Appl. No. 15/348,591.
Office Action, dated May 27, 2020, from corresponding U.S. Appl. No. 16/131,397.
Final Office Action, dated Jul. 8, 2020, from corresponding U.S. Appl. No. 15/910,853.
Restriction Requirement, dated Jul. 1, 2020, from corresponding US. Appl. No. 16/041,586.
Austrian Patent Application No. A 330/2011, filed Mar. 10, 2011, entitled "Verfahren and Vorrichtung zum Entfernen von Verunreinigungen aus einer Kunststoffschmelze".
International Search Report, dated Jul. 5, 2012, from corresponding International Application No. PCT/AT2012/000052.
International Search Report, dated Oct. 30, 2019, from corresponding International Application No. PCT/US2019/042456.
Invitation to Pay Additional Fees, dated Oct. 18, 2019, from corresponding International Application No. PCT/US2019/042458.
Office Action, dated Nov. 25, 2019, from corresponding U.S. Appl. No. 15/804,501.
Written Opinion of the International Searching Authority, dated Oct. 30, 2019, from corresponding International Application No. PCT/US2019/042456.
Office Action, dated Dec. 2, 2019, from corresponding U.S. Appl. No. 16/664,730.
Office Action, dated Nov. 29, 2019, from corresponding U.S. Appl. No. 16/557,076.
International Preliminary Report on Patentability, dated Mar. 26, 2020, from corresponding International Application No. PCT/US2018/051043.
Notice of Allowance, dated Apr. 9, 2020, from corresponding U.S. Appl. No. 16/684,490.
Final Office Action, dated Jan. 9, 2020, from corresponding U.S. Appl. No. 15/348,591.
International Search Report, dated Dec. 10, 2019, from corresponding International Application No. PCT/US2019/042458.
Office Action, dated Jan. 29, 2020, from corresponding U.S. Appl. No. 16/684,490.
Written Opinion of the International Searching Authority, dated Dec. 10, 2019, from corresponding International Application No. PCT/US2019/042458.
Notice of Allowance, dated Feb. 3, 2020, from corresponding U.S. Appl. No. 16/041,442.
Final Office Action, dated Jun. 11, 2020, from corresponding U.S. Appl. No. 15/804,501.
Final Office Action, dated Jun. 11, 2020, from corresponding U.S. Appl. No. 16/409,599.
Gneuss website, https://www.gneuss.com/en/polymer-technologies/extrusion/mrs-extruded, dated Jun. 5, 2020, pp. 1-4.

(56) References Cited

OTHER PUBLICATIONS

Final Office Action, dated Jun. 15, 2020, from corresponding U.S. Appl. No. 16/557,076.
Office Action, dated Jun. 24, 2020, from corresponding U.S. Appl. No. 16/348,117.
Office Action, dated Nov. 2, 2020, from corresponding U.S. Appl. No. 15/804,501.
Office Action, dated Nov. 18, 2020, from corresponding U.S. Appl. No. 16/664,724.
Office Action, dated Oct. 27, 2020, from corresponding U.S. Appl. No. 16/409,599.
Restriction Requirement, dated Oct. 20, 2020, from corresponding U.S. Appl. No. 16/480,302.
International Search Report, dated Sep. 3, 2020, from corresponding International Application No. PCT/US2020/036094.
Written Opinion of the International Searching Authority, dated Sep. 3, 2020, from corresponding International Application No. PCT/US2020/036094.
European Search Report, dated Apr. 28, 2020, from corresponding European Application No. 17869117.6.
Final Office Action, dated Sep. 28, 2020, from corresponding U.S. Appl. No. 16/131,397.
Office Action, dated Mar. 1, 2021, from corresponding U.S. Appl. No. 16/131,397.
Final Office Action, dated Dec. 31, 2020, from corresponding U.S. Appl. No. 16/348,117.
Office Action, dated Jan. 8, 2021, from corresponding U.S. Appl. No. 16/557,076.
International Preliminary Report on Patentability, dated Feb. 4, 2021, from corresponding International Application No. PCT/US2019/042456.
International Preliminary Report on Patentability, dated Feb. 4, 2021, from corresponding International Application No. PCT/US2019/042458.
Office Action, dated Feb. 12, 2021, from corresponding U.S. Appl. No. 16/480,302.
Notice of Allowance, dated Feb. 25, 2021, from corresponding U.S. Appl. No. 16/664,724.
Advisory Action, dated Apr. 9, 2021, from corresponding U.S. Appl. No. 16/348,117.

* cited by examiner

METHODS FOR MANUFACTURING BULKED CONTINUOUS FILAMENT FROM COLORED RECYCLED PET

CROSS-REFERENCE TO RELATED APPLICATIONS

This application is a continuation of U.S. patent application Ser. No. 15/419,955, filed Jan. 30, 2017, now U.S. Pat. No. 10,487,422, issued Nov. 26, 2019, entitled "Methods for Manufacturing Bulked Continuous Filament from Colored Recycled PET," which is a continuation-in-part of U.S. patent application Ser. No. 15/396,143, filed Dec. 30, 2016, now U.S. Pat. No. 10,493,660, issued Dec. 3, 2019, entitled "Systems and Methods for Manufacturing Bulked Continuous Filament," which is a continuation of U.S. patent application Ser. No. 13/892,713, filed May 13, 2013 and issued as U.S. Pat. No. 9,550,338, entitled "Systems and Methods for Manufacturing Bulked Continuous Filament," which is a divisional of U.S. patent application Ser. No. 13/721,955, filed Dec. 20, 2012 and issued as U.S. Pat. No. 8,597,553, entitled "Systems and Methods for Manufacturing Bulked Continuous Filament," which claims priority to U.S. Provisional Patent Application No. 61/654,016, filed May 31, 2012, entitled "Systems and Methods for Manufacturing Bulked Continuous Fiber," each of which is hereby incorporated herein by reference in its entirety.

BACKGROUND

Because pure virgin PET polymer is more expensive than recycled PET polymer, and because of the environmental benefits associated with using recycled polymer, it would be desirable to be able to produce bulked continuous carpet filament, and other items, from 100% recycled PET polymer (e.g., PET polymer from post-consumer PET bottles).

SUMMARY

Various embodiments are directed to a method of manufacturing bulked continuous carpet filament from recycled PET that includes both clear and colored PET. In particular embodiments, the method includes: (A) providing an extrusion system that comprises a first extruder, a second extruder, and a pressure regulation system that is adapted to maintain a pressure within the first and second extruders between about 0 millibars and about 5 millibars; (B) using the pressure regulation system to reduce a pressure within the first and second extruders to between about 0 millibars and about 5 millibars; (C) providing a plurality of polymer flakes, the plurality of polymer flakes comprising between about six percent and about ten percent colored recycled polyethylene terephthalate (PET) flakes and balance substantially clear recycled PET flakes; (D) providing one or more color additives; (E) adding the one or more color additives to the plurality of polymer flakes such that the resulting mixture comprises between about zero percent and about three percent of the one or more color additives by weight; (F) while maintaining the pressure within the first and second extruders between about 0 millibars and about 5 millibars, passing the plurality of polymer flakes and the one or more color additives through the extrusion system to form a polymer melt so that a first portion of the polymer melt passes through the first extruder and a second portion of the polymer melt passes through the second extruder; and (G) after the step of passing the polymer melt through the extrusion system, forming the recycled polymer into bulked continuous carpet filament.

A method of manufacturing carpet filament from clear and colored recycled PET bottles, according to particular embodiments, includes the steps of: (A) providing a plurality of recycled PET bottles; (B) grinding the plurality of recycled PET bottles into a group of polymer flakes, the group of polymer flakes comprising up to about ten percent colored polymer flakes and balance substantially clear polymer flakes; (C) washing the group of polymer flakes; (D) providing a color additive; (E) mixing the color additive with the group of polymer flakes to form a color additive-polymer mixture comprising up to about three percent color additive by weight; (F) melting the color additive-polymer mixture to produce a polymer melt; (G) providing an extruder that extrudes material in a plurality of different extrusion streams; (H) reducing a pressure within the extruder to between about 0 millibars and about 12 millibars; (I) while maintaining the pressure within the extruder between about 0 millibars and about 12 millibars, passing the polymer melt through the extruder so that the polymer melt is divided into a plurality of extrusion streams, each having a pressure between about 0 millibars and about 12 millibars; (J) after passing the polymer melt through the extruder, filtering the polymer melt through at least one filter; and (K) after passing the polymer melt through the filter, forming the polymer melt into bulked continuous carpet filament.

A method of manufacturing bulked continuous carpet filament, in some embodiments, includes: (A) providing an extrusion system that comprises a first extruder, a second extruder, a third extruder, a fourth extruder, and a pressure regulation system that is adapted to maintain a pressure within the first, second, third, and fourth extruders between about 1 millibar and about 18 millibars; (B) using the pressure regulation system to reduce a pressure within the first, second, third, and fourth extruders to between about 0 millibars and about 18 millibars; (C) while maintaining the pressure within the first, second, third, and fourth extruders between about 1 millibar and about 18 millibars, passing a polymer melt through the extrusion system so that: (1) a first portion of the melt passes through the first extruder, (2) a second portion of the melt passes through the second extruder, (3) a third portion of the melt passes through the third extruder, and (4) a fourth portion of the melt passes through the fourth extruder, wherein the polymer melt comprises between about seven percent and about nine percent colored recycled PET by weight, between about two percent and about three percent color additive by weight, and balance recycled substantially clear PET; and (D) after the step of passing the polymer melt through the extrusion system, forming the polymer melt into bulked continuous carpet filament.

BRIEF DESCRIPTION OF THE DRAWINGS

Having described various embodiments in general terms, reference will now be made to the accompanying drawings, which are not necessarily drawn to scale, and wherein.

DETAILED DESCRIPTION OF VARIOUS EMBODIMENTS

Figure 1:
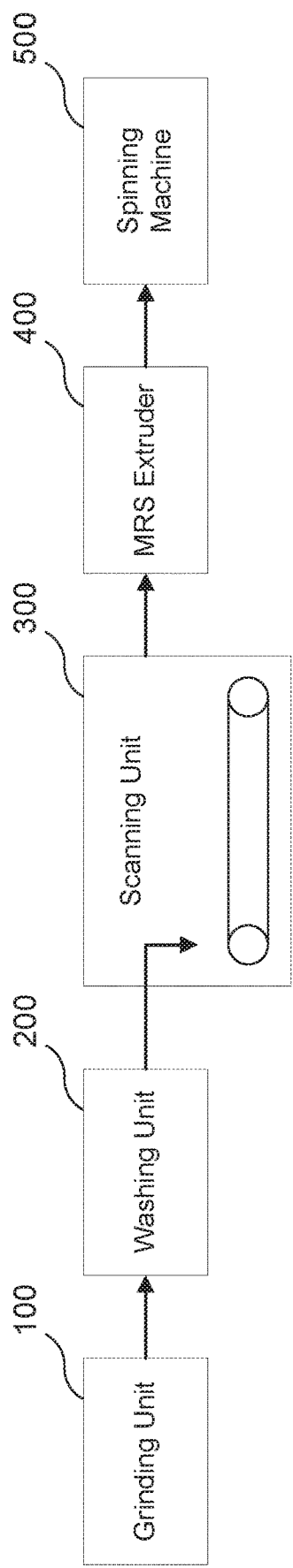
FIG. 1 depicts a process flow, according to a particular embodiment, for manufacturing bulked continuous carpet filament.

Various embodiments will now be described in greater detail. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

I. Overview

New processes for making fiber from recycled polymer (e.g., recycled PET polymer) are described below. In various embodiments, this new process: (1) is more effective than earlier processes in removing contaminates and water from the recycled polymer; and/or (2) does not require the polymer to be melted and cooled as many times as in earlier processes. In at least one embodiment, the improved process results in a recycled PET polymer having a polymer quality that is high enough that the PET polymer may be used in producing bulked continuous carpet filament from 100% recycled PET content (e.g., 100% from PET obtained from previously used PET bottles). In particular embodiments, the recycled PET polymer has an intrinsic viscosity of at least about 0.79 dL/g (e.g., of between about 0.79 dL/g and about 1.00 dL/g).

II. More Detailed Discussion

A BCF (bulked continuous filament) manufacturing process, according to a particular embodiment, may comprise three steps: (1) preparing flakes of PET polymer from post-consumer bottles for use in the process; (2) passing the flakes through an extruder that melts the flakes and purifies the resulting PET polymer; and (3) feeding the purified polymer into a spinning machine that turns the polymer into filament for use in manufacturing carpets. These three steps are described in greater detail below.

Step 1: Preparing Flakes of Pet Polymer from Post-Consumer Bottles

In a particular embodiment, the step of preparing flakes of PET polymer from post-consumer bottles comprises: (A) sorting post-consumer PET bottles and grinding the bottles into flakes; (B) washing the flakes; and (C) identifying and removing any impurities or impure flakes.

A. Sorting Post-Consumer PET Bottles and Grinding the Bottles into Flakes

In particular embodiments, bales of clear and mixed colored recycled post-consumer (e.g., "curbside") PET bottles (or other containers) obtained from various recycling facilities make-up the post-consumer PET containers for use in the process. In other embodiments, the source of the post-consumer PET containers may be returned 'deposit' bottles (e.g., PET bottles whose price includes a deposit that is returned to a customer when the customer returns the bottle after consuming the bottle's contents). The curbside or returned "post-consumer" or "recycled" containers may contain a small level of non-PET contaminates. The contaminants in the containers may include, for example, non-PET polymeric contaminants (e.g., PVC, PLA, PP, PE, PS, PA, etc.), metal (e.g., ferrous and non-ferrous metal), paper, cardboard, sand, glass or other unwanted materials that may find their way into the collection of recycled PET. The non-PET contaminants may be removed from the desired PET components, for example, through one or more of the various processes described below.

In particular embodiments, smaller components and debris (e.g., components and debris greater than 2 inches in size) are removed from the whole bottles via a rotating trammel. Various metal removal magnets and eddy current systems may be incorporated into the process to remove any metal contaminants. Near Infra-Red optical sorting equipment such as the NRT Multi Sort IR machine from Bulk Handling Systems Company of Eugene, Oreg., or the Spyder IR machine from National Recovery Technologies of Nashville, Tenn., may be utilized to remove any loose polymeric contaminants that may be mixed in with the PET flakes (e.g., PVC, PLA, PP, PE, PS, and PA). Additionally, automated X-ray sorting equipment such as a VINYL-CYCLE machine from National Recovery Technologies of Nashville, Tenn. may be utilized to remove remaining PVC contaminants.

In particular embodiments, a binary segregation of the clear materials from the colored materials is achieved using automated color sorting equipment equipped with a camera detection system (e.g., a Multisort ES machine from National Recovery Technologies of Nashville, Tenn.). In various embodiments, manual sorters are stationed at various points on the line to remove contaminants not removed by the sorter and any colored bottles. In particular embodiments, the sorted material is taken through a granulation step (e.g., using a 50B Granulator machine from Cumberland Engineering Corporation of New Berlin, Wis.) to size reduce (e.g., grind) the bottles down to a size of less than one half of an inch. In various embodiments, the bottle labels are removed from the resultant "dirty flake" (e.g., the PET flakes formed during the granulation step) via an air separation system prior to entering the wash process.

B. Washing the Flakes

In particular embodiments, the "dirty flake" is then mixed into a series of wash tanks. As part of the wash process, in various embodiments, an aqueous density separation is utilized to separate any olefin bottle caps (which may, for example, be present in the "dirty flake" as remnants from recycled PET bottles) from the higher specific gravity PET flakes. In particular embodiments, the flakes are washed in a heated caustic bath to about 190 degrees Fahrenheit. In particular embodiments, the caustic bath is maintained at a concentration of between about 0.6% and about 1.2% sodium hydroxide. In various embodiments, soap surfactants as well as defoaming agents are added to the caustic bath, for example, to further increase the separation and cleaning of the flakes. A double rinse system then washes the caustic from the flakes.

In various embodiments, the flake is centrifugally dewatered and then dried with hot air to at least substantially remove any surface moisture. The resultant "clean flake" is then processed through an electrostatic separation system (e.g., an electrostatic separator from Carpco, Inc. of Jacksonville, Fla.) and a flake metal detection system (e.g., an MSS Metal Sorting System) to further remove any metal contaminants that remain in the flake. In particular embodiments, an air separation step removes any remaining label from the clean flake. In various embodiments, the flake is then taken through a flake color sorting step (e.g., using an OPTIMIX machine from TSM Control Systems of Dundalk, Ireland) to remove any remaining color contaminants remaining in the flake. In various embodiments, an electro-optical flake sorter based at least in part on Raman technology (e.g., a Powersort 200 from Unisensor Sensorsysteme GmbH of Karlsruhe, Germany) performs the final polymer separation to remove any non-PET polymers remaining in the flake. This step may also further remove any remaining metal contaminants and color contaminants.

In various embodiments, the combination of these steps delivers substantially clean (e.g., clean) PET bottle flake comprising less than about 50 parts per million PVC (e.g., 25 ppm PVC) and less than about 15 parts per million metals for use in the downstream extrusion process described below.

C. Identifying and Removing Impurities and Impure Flakes

In particular embodiments, after the flakes are washed, they are fed down a conveyor and scanned with a high-speed laser system 300. In various embodiments, particular lasers that make up the high-speed laser system 300 are configured to detect the presence of particular contaminates (e.g., PVC or Aluminum). Flakes that are identified as not consisting essentially of PET may be blown from the main stream of flakes with air jets. In various embodiments, the resulting level of non-PET flakes is less than 25 ppm.

In various embodiments, the system is adapted to ensure that the PET polymer being processed into filament is substantially free of water (e.g., entirely free of water). In a particular embodiment, the flakes are placed into a pre-conditioner for between about 20 and about 40 minutes (e.g., about 30 minutes) during which the pre-conditioner blows the surface water off of the flakes. In particular embodiments, interstitial water remains within the flakes. In various embodiments, these "wet" flakes (e.g., flakes comprising interstitial water) may then be fed into an extruder (e.g., as described in Step 2 below), which includes a vacuum setup designed to remove—among other things—the interstitial water that remains present in the flakes following the quick-drying process described above.

Step 2: Using an Extrusion System to Melt and Purify PET Flakes

Figure 2:
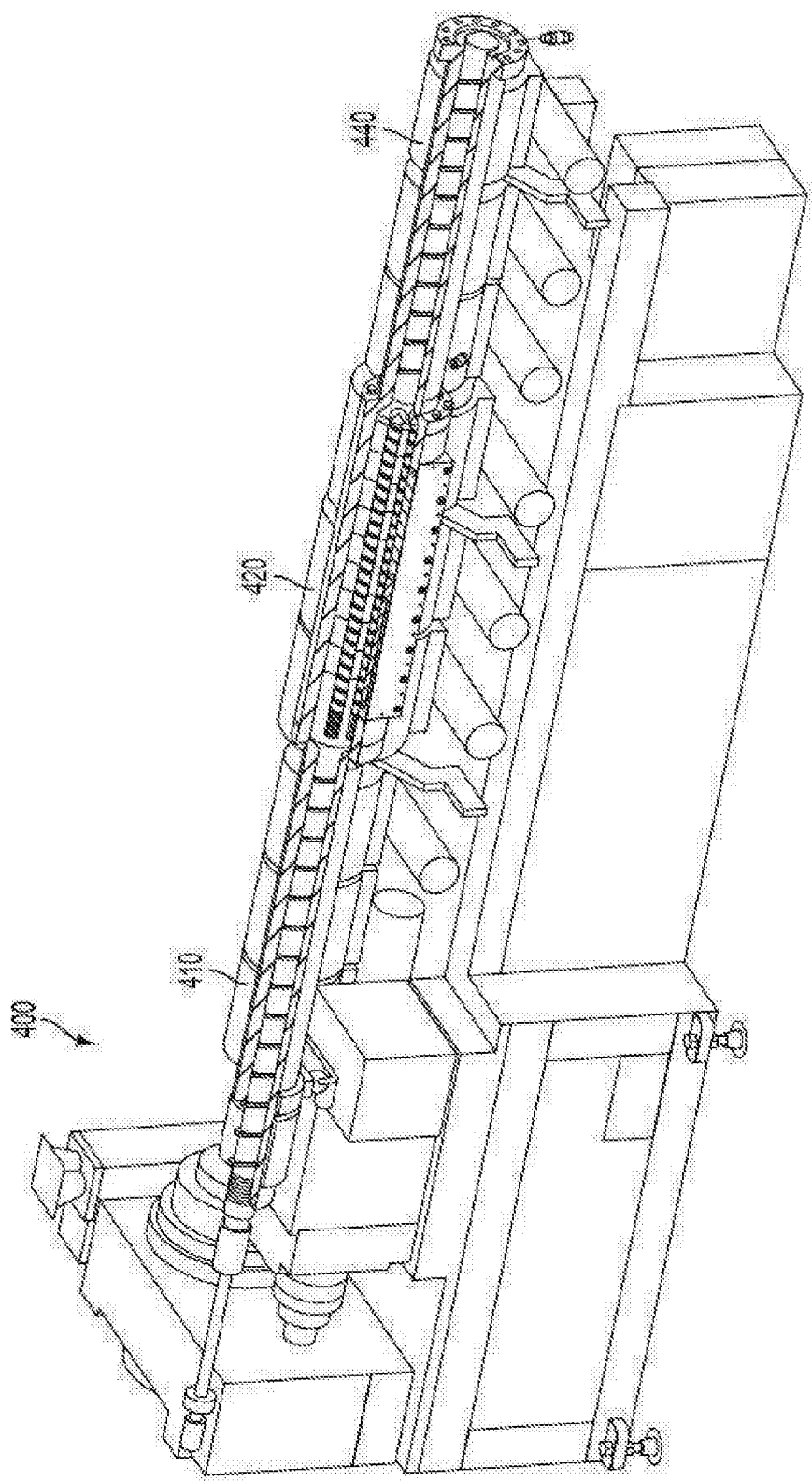
FIG. 2 is a perspective view of an exemplary MRS extruder that is suitable for use in the process of FIG. 1.
Figure 3:
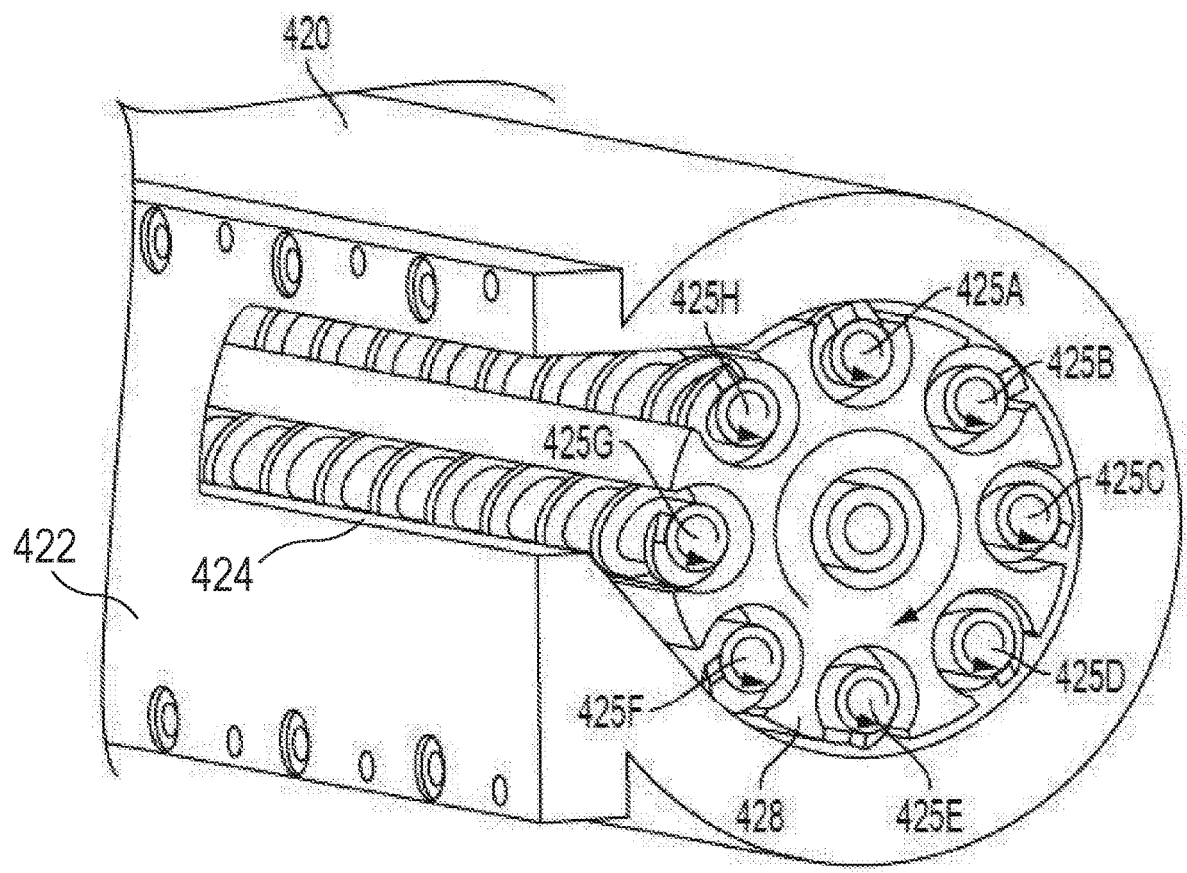
FIG. 3 is a cross-sectional view of an exemplary MRS section of the MRS extruder of FIG. 2.

In particular embodiments, an extruder is used to turn the wet flakes described above into a molten recycled PET polymer and to perform a number of purification processes to prepare the polymer to be turned into BCF for carpet. As noted above, in various embodiments, after STEP 1 is complete, the recycled PET polymer flakes are wet (e.g., surface water is substantially removed (e.g., fully removed) from the flakes, but interstitial water remains in the flakes). In particular embodiments, these wet flakes are fed into a Multiple Rotating Screw ("MRS") extruder 400. In other embodiments, the wet flakes are fed into any other suitable extruder (e.g., a twin screw extruder, a multiple screw extruder, a planetary extruder, or any other suitable extrusion system). An exemplary MRS Extruder 400 is shown in FIGS. 2 and 3. A particular example of such an MRS extruder is described in U.S. Published Patent Application 2005/0047267, entitled "Extruder for Producing Molten Plastic Materials", which was published on Mar. 3, 2005, and which is hereby incorporated herein by reference.

As may be understood from this figure, in particular embodiments, the MRS extruder includes a first single-screw extruder section 410 for feeding material into an MRS section 420 and a second single-screw extruder section 440 for transporting material away from the MRS section.

In various embodiments, the wet flakes are fed directly into the MRS extruder 400 substantially immediately (e.g., immediately) following the washing step described above (e.g., without drying the flakes or allowing the flakes to dry). In particular embodiments, a system that feeds the wet flakes directly into the MRS Extruder 400 substantially immediately (e.g., immediately) following the washing step described above may consume about 20% less energy than a system that substantially fully pre-dries the flakes before extrusion (e.g., a system that pre-dries the flakes by passing hot air over the wet flakes for a prolonged period of time). In various embodiments, a system that feeds the wet flakes directly into the MRS Extruder 400 substantially immediately (e.g., immediately) following the washing step described above avoids the need to wait a period of time (e.g., up to eight hours) generally required to fully dry the flakes (e.g., remove all of the surface and interstitial water from the flakes).

Figure 4:
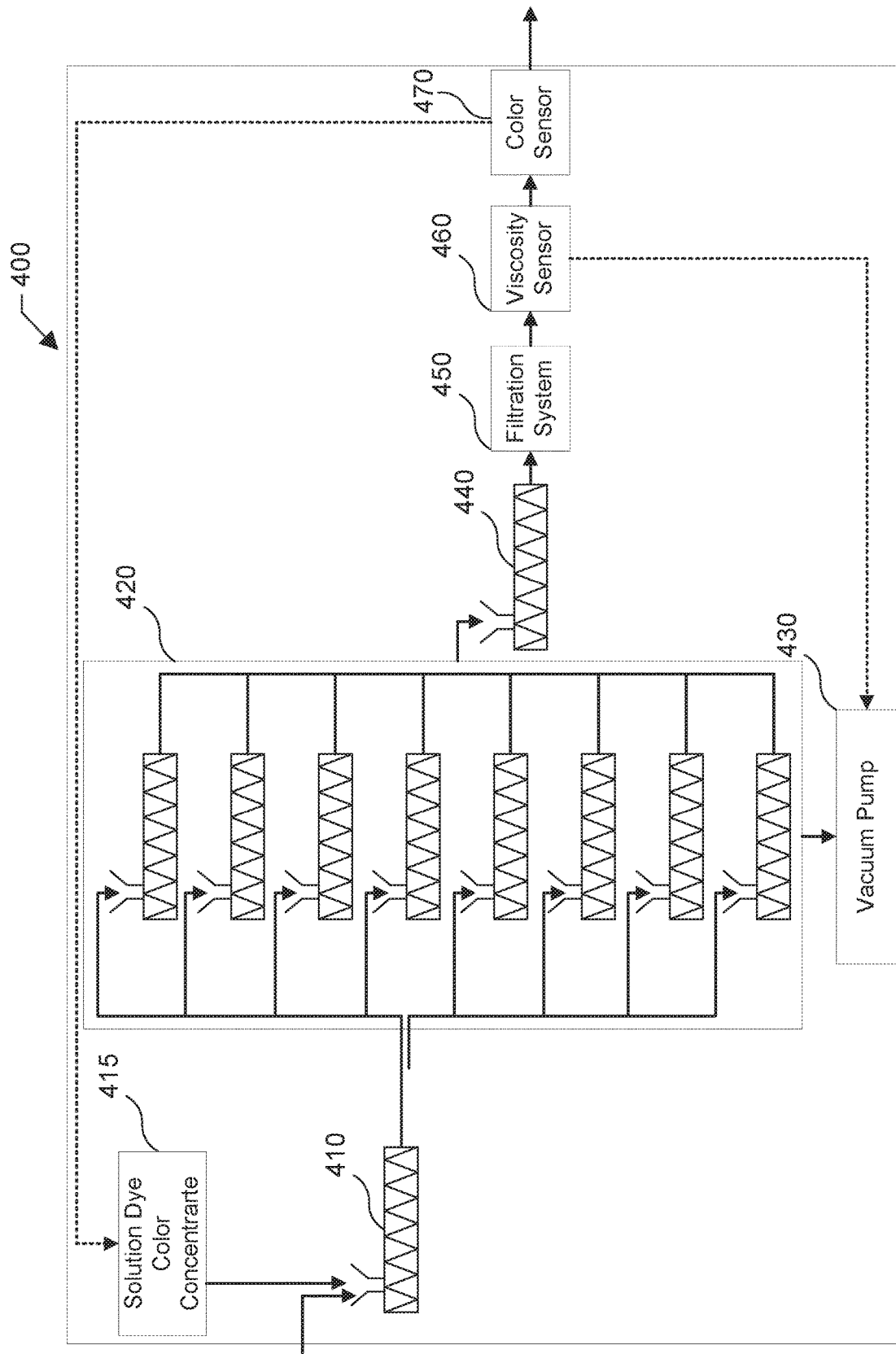
FIG. 4 depicts a process flow depicting the flow of polymer through an MRS extruder and filtration system according to a particular embodiment.

FIG. 4 depicts a process flow that illustrates the various processes performed by the MRS Extruder 400 in a particular embodiment. In the embodiment shown in this figure, the wet flakes are first fed through the MRS extruder's first single-screw extruder section 410, which may, for example, generate sufficient heat (e.g., via shearing) to at least substantially melt (e.g., melt) the wet flakes.

In the embodiment shown in this figure, the system is further configured to add a Solution Dye Color Concentrate 415 to the flakes (e.g., wet flakes) before feeding the flakes into the first singe-screw extruder section 410. In particular embodiments, the Solution Dye Color Concentrate 415 may include any suitable color concentrate, which may, for example, result in a particular color of polymer fiber following extrusion. In particular embodiments, the color concentrate may comprise pelletized color concentrate as well as a carrier resin which may, for example, bind the colorant to the polymer. In various embodiments, adding color concentrate to the flakes prior to extrusion may result in polymer filament that is at least partially impregnated (e.g., impregnated) with a color pigment. In particular embodiments, carpet produced from solution dyed filament may be highly resistant to color loss through fading from sunlight, ozone, harsh cleaning agents such as bleach, or other factors.

In various embodiments, the system is configured to adjust an amount of Solution Dye Color Concentrate 415 to add to the flakes prior to feeding the flakes thought the first single-screw extruder section 410. In particular embodiments, the system is configured to add between about two percent and about three percent color concentrate by mass to the polymer flake. In other embodiments, the system is configured to between about zero percent and about three percent color concentrate by mass. In still other embodiments, the system is configured to add up to about six percent color concentrate by mass to the polymer flake prior to extrusion. In some embodiments, the system is configured to add between about one percent and three percent color concentrate by mass to the polymer flake. In still other embodiments, the system is configured to add any suitable ratio of color concentrate to polymer flake in order to achieve a particular color of molten polymer (and ultimately polymer fiber) following extrusion.

Although in the embodiment shown in this figure, the Solution Dye Color Concentrate 415 is depicted as added to the polymer flake prior to feeding the flake through the first single-screw extruder section 410, it should be understood that in other embodiments, the Solution Dye Color Concentrate 15 may be added during any other suitable phase of the process described in this document. For example, In various embodiments, the system is configured to add the Solution Dye Color Concentrate 415 following extrusion of the polymer flake by the first single-screw extruder section 410 but prior to feeding the resultant polymer melt through the extruder's MRS section 420 discussed below. In still other embodiments, the system may add the Solution Dye Color Concentrate 415 after the flake has passed through the MRS extruder's MRS section 420 prior to passing the polymer melt through the second single screw section 440 discussed below. In still other embodiments, they system may add the Solution dye Color Concentrate 415 while the flakes and/or polymer melt are being extruded in the first single-screw extruder section 410, MRS Section 420, second single screw section 440, or at any other suitable phase of the process. In still other embodiments, the system may add the Solution Dye Color Concentrate 415 during one or more (e.g., a plurality) of the phases of the process described herein (e.g., the system may add some Solution Dye Color Concentrate 415 to the polymer flake prior to passing the flake through the single-screw extruder section 410 and some additional solution Dye Color Concentrate 415 following extrusion through the MRS Section 420).

Following the addition of the color concentrate and extrusion by the first single-screw extruder section 410, the resultant polymer melt (e.g., comprising the melted flakes and color concentrate), in various embodiments, is then fed into the extruder's MRS section 420, in which the extruder separates the melt flow into a plurality of different streams (e.g., 4, 6, 8, or more streams) through a plurality of open chambers. FIG. 3 shows a detailed cutaway view of an MRS Section 420 according to a particular embodiment. In particular embodiments, such as the embodiment shown in this figure, the MRS Section 420 separates the melt flow into eight different streams, which are subsequently fed through eight satellite screws 425A-H. As may be understood from FIG. 2, in particular embodiments, these satellite screws are substantially parallel (e.g., parallel) to one other and to a primary screw axis of the MRS Machine 400.

In the MRS section 420, in various embodiments, the satellite screws 425A-H may, for example, rotate faster than (e.g., about four times faster than) in previous systems. As shown in FIG. 3, in particular embodiments: (1) the satellite screws 425A-H are arranged within a single screw drum 428 that is mounted to rotate about its central axis; and (2) the satellite screws 425A-H are configured to rotate in a direction that is opposite to the direction in which the single screw drum rotates 428. In various other embodiments, the satellite screws 425A-H and the single screw drum 428 rotate in the same direction. In particular embodiments, the rotation of the satellite screws 425A-H is driven by a ring gear. Also, in various embodiments, the single screw drum 428 rotates about four times faster than each individual satellite screw 425A-H. In certain embodiments, the satellite screws 425A-H rotate at substantially similar (e.g., the same) speeds.

In various embodiments, as may be understood from FIG. 4, the satellite screws 425A-H are housed within respective extruder barrels, which may, for example be about 30% open to the outer chamber of the MRS section 420. In particular embodiments, the rotation of the satellite screws 425A-H and single screw drum 428 increases the surface exchange of the polymer melt (e.g., exposes more surface area of the melted polymer to the open chamber than in previous systems). In various embodiments, the MRS section 420 creates a melt surface area that is, for example, between about twenty and about thirty times greater than the melt surface area created by a co-rotating twin screw extruder. In a particular embodiment, the MRS section 420 creates a melt surface area that is, for example, about twenty five times greater than the melt surface area created by a co-rotating twin screw extruder.

In various embodiments, the MRS extruder's MRS Section 420 is fitted with a Vacuum Pump 430 that is attached to a vacuum attachment portion 422 of the MRS section 420 so that the Vacuum Pump 430 is in communication with the interior of the MRS section via a suitable opening 424 in the MRS section's housing. In still other embodiments, the MRS Section 420 is fitted with a series of Vacuum Pumps. In particular embodiments, the Vacuum Pump 430 is configured to reduce the pressure within the interior of the MRS Section 420 to a pressure that is between about 0.5 millibars and about 5 millibars. In particular embodiments, the Vacuum Pump 430 is configured to reduce the pressure in the MRS Section 420 to less than about 1.5 millibars (e.g., about 1 millibar or less). The low-pressure vacuum created by the Vacuum Pump 430 in the MRS Section 420 may remove, for example: (1) volatile organics present in the melted polymer as the melted polymer passes through the MRS Section 420; and/or (2) at least a portion of any interstitial water that was present in the wet flakes when the wet flakes entered the MRS Extruder 400. In various embodiments, the low-pressure vacuum removes substantially all (e.g., all) of the water and contaminants from the polymer stream.

In a particular example, the Vacuum Pump 430 comprises three mechanical lobe vacuum pumps (e.g., arranged in series) to reduce the pressure in the chamber to a suitable level (e.g., to a pressure of about 1.0 millibar). In other embodiments, rather than the three mechanical lobe vacuum pump arrangement discussed above, the Vacuum Pump 430 includes a jet vacuum pump fit to the MRS extruder. In various embodiments, the jet vacuum pump is configured to achieve about 1 millibar of pressure in the interior of the MRS section 420 and about the same results described above regarding a resulting intrinsic viscosity of the polymer melt. In various embodiments, using a jet vacuum pump can be advantageous because jet vacuum pumps are steam powered and therefore substantially self-cleaning (e.g., self-cleaning), thereby reducing the maintenance required in comparison to mechanical lobe pumps (which may, for example, require repeated cleaning due to volatiles coming off and condensing on the lobes of the pump). In a particular embodiment, the Vacuum Pump 430 is a jet vacuum pump is made by Arpuma GmbH of Bergheim, Germany.

In particular embodiments, after the molten polymer is run through the multi-stream MRS Section 420, the streams of molten polymer are recombined and flow into the MRS extruder's second single screw section 440. In various embodiments, the single stream of molten polymer is next run through a filtration system 450 that includes at least one filter. In a particular embodiment, the filtration system 450 includes two levels of filtration (e.g., a 40 micron screen filter followed by a 25 micron screen filter). Although, in various embodiments, water and volatile organic impurities are removed during the vacuum process as discussed above, particulate contaminants such as, for example, aluminum particles, sand, dirt, and other contaminants may remain in the polymer melt. Thus, this filtration step may be advantageous in removing particulate contaminants (e.g., particulate contaminates that were not removed in the MRS Section 420).

In particular embodiments, a viscosity sensor 460 (see FIG. 4) is used to sense the melt viscosity of the molten polymer stream following its passage through the filtration system 450. In various embodiments, the viscosity sensor 460, measures the melt viscosity of the stream, for example, by measuring the stream's pressure drop across a known area. In particular embodiments, in response to measuring an intrinsic viscosity of the stream that is below a predetermined level (e.g., below about 0.8 g/dL), the system may: (1) discard the portion of the stream with low intrinsic viscosity; and/or (2) lower the pressure in the MRS Section 420 in order to achieve a higher intrinsic viscosity in the polymer melt. In particular embodiments, decreasing the pressure in the MRS Section 420 is executed in a substantially automated manner (e.g., automatically) using the viscosity sensor in a computer-controlled feedback control loop with the vacuum section 430.

In particular embodiments, removing the water and contaminates from the polymer improves the intrinsic viscosity of the recycled PET polymer by allowing polymer chains in the polymer to reconnect and extend the chain length. In particular embodiments, following its passage through the MRS Section 420 with its attached Vacuum Pump 430, the recycled polymer melt has an intrinsic viscosity of at least about 0.79 dL/g (e.g., of between about 0.79 dL/g and about 1.00 dL/g). In particular embodiments, passage through the low pressure MRS Section 420 purifies the recycled polymer melt (e.g., by removing the contaminants and interstitial water) and makes the recycled polymer substantially structurally similar to (e.g., structurally the same as) pure virgin PET polymer. In particular embodiments, the water removed by the vacuum includes both water from the wash water used to clean the recycled PET bottles as described above, as well as from unreacted water generated by the melting of the PET polymer in the single screw heater 410 (e.g., interstitial water). In particular embodiments, the majority of water present in the polymer is wash water, but some percentage may be unreacted water.

Returning to FIG. 4, in particular embodiments, a Color Sensor 470 is used to determine a color of the resultant polymer melt. In various embodiments, the Color Sensor 470 comprises one or more spectrographs configured to separate light shone through the polymer melt into a frequency spectrum to determine the color of the polymer melt. In still other embodiments, the Color Sensor 470 comprises one or more cameras or other suitable imaging devices configured to determine a color of the resultant polymer melt. In particular embodiments, in response to determining that the color of the polymer melt is a color other than a desired color (e.g., the polymer melt is lighter than desired, darker than desired, a color other than the desired color, etc.) the system may: (1) discard the portion of the stream with the incorrect color; and/or (2) adjust an amount of Solution Dye Color Concentrate 415 that is added to the flake and/or the polymer melt upstream in order to adjust a color of the resultant polymer melt. In particular embodiments, adjusting the amount of Solution Dye Color Concentrate 415 is executed in a substantially automated manner (e.g., automatically) using the Color Sensor 470 in a computer-controlled feedback control loop.

In particular embodiments, the resulting polymer is a recycled PET polymer (e.g., obtained 100% from post-consumer PET products, such as PET bottles or containers) having a polymer quality that is suitable for use in producing PET carpet filament using substantially only (e.g., only) PET from recycled PET products.

Step 3: Purified PET Polymer Fed into Spinning Machine to be Turned into Carpet Yarn In particular embodiments, after the recycled PET polymer has been extruded and purified by the above-described extrusion process, the resulting molten recycled PET polymer is fed directly into a BCF (or "spinning") machine 500 that is configured to turn the molten polymer into bulked continuous filament. For example, in various embodiments, the output of the MRS extruder 400 is connected substantially directly (e.g., directly) to the input of the spinning machine 500 so that molten polymer from the extruder is fed directly into the spinning machine 500. This process may be advantageous because molten polymer may, in certain embodiments, not need to be cooled into pellets after extrusion (as it would need to be if the recycled polymer were being mixed with virgin PET polymer). In particular embodiments, not cooling the recycled molten polymer into pellets serves to avoid potential chain scission in the polymer that might lower the polymer's intrinsic viscosity.

In particular embodiments, the spinning machine 500 extrudes molten polymer through small holes in a spinneret in order to produce carpet yarn filament from the polymer. In particular embodiments, the molten recycled PET polymer cools after leaving the spinneret. The carpet yarn is then taken up by rollers and ultimately turned into filaments that are used to produce carpet. In various embodiments, the carpet yarn produced by the spinning machine 500 may have a tenacity between about 3 gram-force per unit denier (gf/den) and about 9 gf/den. In particular embodiments, the resulting carpet yarn has a tenacity of at least about 3 gf/den.

In particular embodiments, the spinning machine 500 used in the process described above is the Sytec One spinning machine manufactured by Oerlika Neumag of Neumuenster, Germany. The Sytec One machine may be especially adapted for hard-to-run fibers, such as nylon or solution-dyed fibers, where the filaments are prone to breakage during processing. In various embodiments, the Sytec One machine keeps the runs downstream of the spinneret as straight as possible, uses only one threadline, and is designed to be quick to rethread when there are filament breaks.

Although the example described above describes using the Sytec One spinning machine to produce carpet yarn filament from the polymer, it should be understood that any other suitable spinning machine may be used. Such spinning machines may include, for example, any suitable one-threadline or three-threadline spinning machine made by Oerlika Neumag of Neumuenster, Germany or any other company.

In various embodiments, the improved strength of the recycled PET polymer generated using the process above allows it to be run at higher speeds through the spinning machine 500 than would be possible using pure virgin PET polymer. This may allow for higher processing speeds than are possible when using virgin PET polymer.

Summary of Exemplary Process

Figure 5:
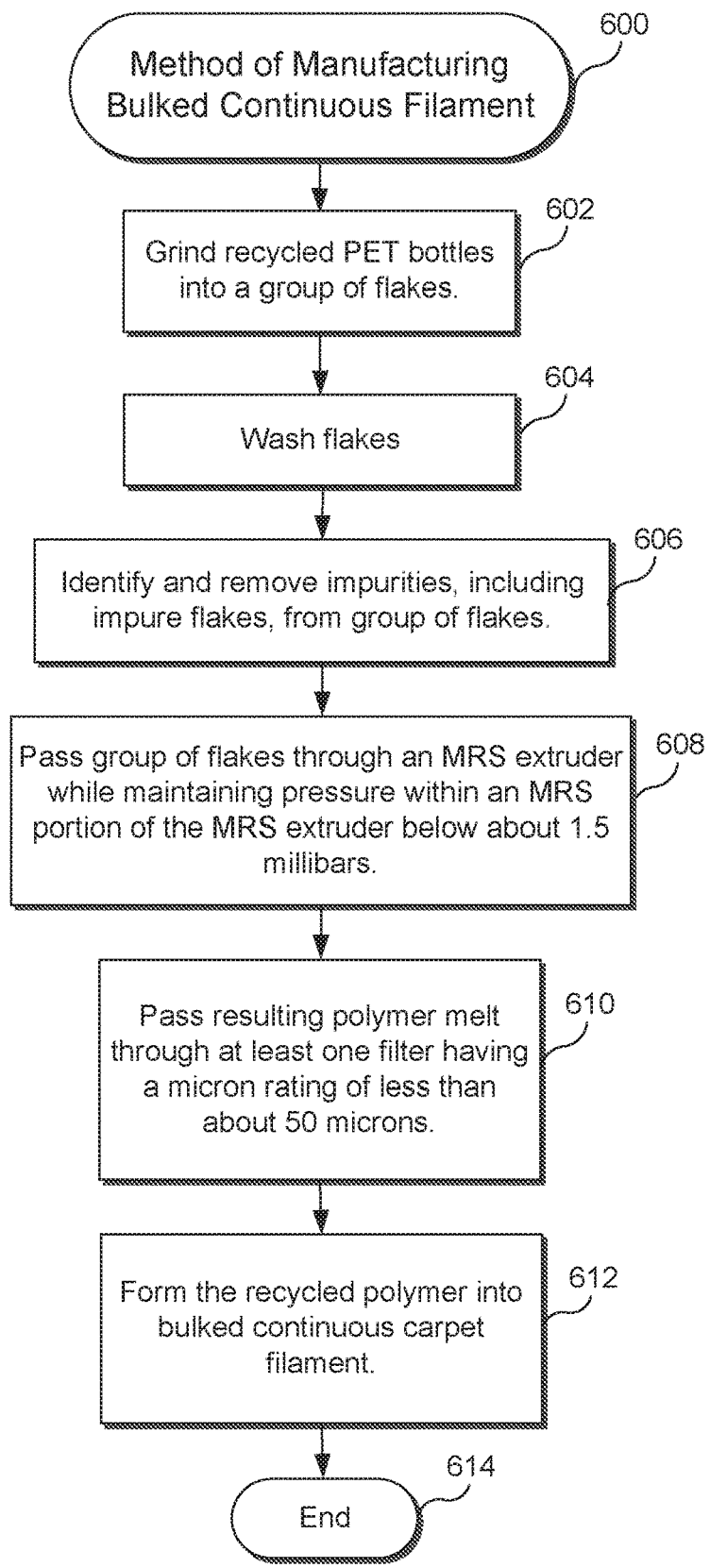
FIG. 5 is a high-level flow chart of a method, according to various embodiments, of manufacturing bulked continuous carpet filament.

FIG. 5 provides a high-level summary of various embodiments of the method of manufacturing bulked continuous filament described above. As shown in the figure, the method begins at Step 602, where recycled PET bottles are ground into a group of flakes. Next, at Step 604, the group of flakes is washed to remove contaminants from the flakes' respective outer surfaces. Next, at Step 606, the group of flakes is scanned (e.g., using one or more of the methods discussed above) to identify impurities, including impure flakes. These impurities, and impure flakes, are then removed from the group of flakes.

Next, at Step 608, the group of flakes is passed through an MRS extruder while maintaining the pressure within an MRS portion of the extruder below about 1.5 millibars. At Step 610, the resulting polymer melt is passed through at least one filter having a micron rating of less than about 50 microns. Finally, at Step 612, the recycled polymer is formed into bulked continuous carpet filament, which may be used in producing carpet. The method then ends at Step 614.

Alternative Embodiments

In particular embodiments, the system may comprise alternative components or perform alternative processes in order to produce substantially continuous BCF from 100% recycled PET, or other recycled polymer. Exemplary alternatives are discussed below.

Non-MRS Extrusion System

In particular embodiments, the process may utilize a polymer flow extrusion system other than the MRS Extruder described above. The alternative extrusion system may include for example, a twin screw extruder, a multiple screw extruder, a planetary extruder, or any other suitable extrusion system. In a particular embodiment, the process may include a plurality of any combination of any suitable conical screw extruders (e.g., four twin screw extruders, three multiple screw extruders, etc.).

Making Carpet Yarn from 100% Recycled Carpet

In particular embodiments, the process described above may be adapted for processing and preparing old carpet (or any other suitable post-consumer product) to produce new carpet yarn comprising 100% recycled carpet. In such embodiments, the process begins by grinding and washing recycled carpet rather than recycled PET bottles. In various embodiments where old carpet is converted into new carpet yarn comprising 100% recycled carpet, the process may comprise additional steps to remove additional materials or impurities that may be present in recycled carpet that may not be present in recycled PET bottles (e.g., carpet backing, adhesive, etc.).

Other Sources of Recycled PET

In various embodiments, the process described above is adapted for processing recycled PET from any suitable source (e.g., sources other than recycled bottles or carpet) to produce new carpet yarn comprising 100% recycled PET.

The Use of a Crystallizer as Part of BCF Process

In various embodiments, the process for producing recycled BCF may further include a crystallizing step that utilizes one or more PET crystallizers. In particular embodiments, the system is configured to perform the crystallization step on the ground flakes prior to running the flakes through the one or more extruders (e.g., single screw extruder, MRS extruder, etc.). In particular embodiments, the PET crystallizer comprises a housing, a hopper screw (e.g., an auger) disposed at least partially within the housing, a stirring apparatus, one or more heating elements, and one or more blowers.

Hopper Screw

In particular embodiments, the hopper screw comprises any suitable screw conveyor (e.g., such as an Archimedes' screw) for moving liquid or granular materials (e.g., such as PET flakes). In various embodiments, the hopper screw comprises a substantially cylindrical shaft and a helical screw blade disposed along at least a portion of the cylindrical shaft. In particular embodiments, the substantially cylindrical shaft is configured to rotate the screw blade, causing that hopper screw to move material (e.g., the PET flakes) along the cylindrical shaft and into the crystallizer housing. In other embodiments, the hopper screw comprises any other suitable screw conveyer such as, for example, a shaftless spiral. In embodiments in which the hopper screw comprises a shaftless spiral, the shaftless spiral may be substantially fixed at one end and free at the other end and configured to be driven at the fixed end. In various embodiments, the hopper screw is disposed at least partially within the crystallizer housing.

In various embodiments, the hopper screw is configured to feed PET flakes into the crystallizer. In various embodiments, the PET crystallizer is configured to feed the PET flakes into the crystallizer using the hopper screw relatively slowly.

One or More Heating Elements

In various embodiments, the crystallizer comprises one or more heating elements for raising a temperature within the crystallizer. In particular embodiments, the one or more heating elements comprise one or more electric heating elements, one or more gas-fired heating elements, or any other suitable heating elements. In some embodiments, the one or more heating elements may be substantially electrically powered. In various embodiments, the one or more heating elements comprise one or more infra-red heating elements. In other embodiments, the one or more heating elements may utilize natural gas such, for example, propane. In particular embodiments, the one or more heating elements are configured to raise a temperature within the crystallizer to between about 100 degrees Fahrenheit and about 180 degrees Fahrenheit. In still other embodiments, the one or more heating elements are configured to raise a temperature within the crystallizer to between about 100 degrees Celsius and 180 degrees Celsius. In some embodiments, the one or more heating elements are configured to maintain a temperature within the crystallizer that is substantially about a maximum crystallization temperature of PET. In particular embodiments, the maximum crystallization temperature of PET is between about 140 degrees Celsius and about 230 degrees Celsius.

One or More Blowers

In various embodiments, the crystallizer further comprises one or more blowers configured to blow air over the flakes as the flakes passes through the crystallizer. In particular embodiments, the one or more blowers comprise any suitable blowers for moving air substantially across a surface area of the flakes as the flakes pass through the crystallizer. For example, in some embodiments, the one or more blowers comprise one or more suitable fans or other suitable mechanisms for moving air. In various embodiments, the one or more blowers are configured to blow air that has been at least partially heated by the one or more heating elements. In particular embodiments, the one or more blowers are configured to blow air having a temperature of at least about 140 degree Fahrenheit. In another particular embodiments, the one or more blowers are configured to blow air having a temperature of at least about 140 degree Celsius. In other embodiments, the one or more blowers are configured to maintain the temperature in the crystallizer between about 140 degrees Fahrenheit and about 180 degrees Fahrenheit. In some embodiments, the one or more blowers are configured to blow hot air from a bottom portion of the crystallizer and draw air from an upper portion of the crystallizer.

Stirring Apparatus

In various embodiments, the crystallizer comprises a stirring apparatus that comprises any suitable apparatus for stirring the PET flakes while the PET flakes are passing through the crystallizer. In various embodiments, the stirring apparatus may be operated, for example, by any suitable gear motor. In a particular embodiment, the stirring apparatus comprises a suitable rod or other suitable mechanism mounted to rotate, or otherwise stir the PET flakes as the PET flakes are passing through the crystallizer. In other embodiments, the stirring apparatus may comprise any suitable tumbler, which may, for example, comprise a drum mounted to rotate via the gear motor such that the PET flakes are at least partially stirred and/or agitated while the PET flakes are within the drum. In still other embodiments, the stirring apparatus comprises one or more screws and/or augers configured to rotate and stir the PET flakes. In particular embodiments, the stirring apparatus comprises the hopper screw.

As may be understood from this disclosure, the stirring apparatus is configured to agitate or stir the PET flakes as the one or more blowers blow air heated by the one or more heating elements across the PET flakes. In particular embodiments, the stirring apparatus is configured to at least partially reduce agglomeration (e.g., sticking or clumping of the flake) while the flake is at least partially crystallizing in the crystallizer.

In particular embodiments, the crystallizer at least partially dries the surface of the PET flakes. In various embodiments, the PET crystallizer is configured to reduce a moisture content of the PET flakes to about 50 ppm. In other embodiments the PET crystallizer is configured to reduce a moisture content of the PET flakes to between about 30 and about 50 ppm.

In various embodiments, the use of drier flakes may enable the system to run the flakes through the MRS extruder more slowly, which may allow for higher pressure within the MRS extruder during extrusion (e.g., may enable the system to maintain a higher pressure within the MRS extruder, rather than very low pressure). In various embodiments of the process, the pressure regulation system may be configured to maintain a pressure within the MRS extruder of between about 0 millibars and about 25 millibars. In particular embodiments, such as embodiments in which the PET flakes have been run through a crystallizer before being extruded in the MRS extruder, the pressure regulation system may be configured to maintain a pressure within the MRS extruder of between about 0 and about 18 millibars. In other embodiments, the pressure regulation system may be configured to maintain a pressure within the MRS extruder between about 0 and about 12 millibars. In still other embodiments, the pressure regulation system may be configured to maintain a pressure within the MRS extruder between about 0 and about 8 millibars. In still other embodiments, the pressure regulation system may be configured to maintain a pressure within the MRS extruder between about 5 millibars and about 10 millibars. In particular embodiments, the pressure regulation system may be configured to maintain a pressure within the MRS extruder at about 5 millibars, about 6 millibars, about 7 millibars, about 8 millibars, about 9 millibars, or about any suitable pressure between about 0 millibars and about 25 millibars.

In particular embodiments, the crystallizer causes the flakes to at least partially reduce in size, which may, for example, reduce a potential for the flakes to stick together. In particular embodiments, the crystallizer may particularly reduce stickiness of larger flakes, which may, for example, include flakes comprising portions of the ground PET bottles which may be thicker than other portions of the PET bottles (e.g., flakes ground from a threaded portion of the PET bottle on which a cap would typically be screwed).

Use of Curbside Recycling v. Deposit Bottles in Process

In various embodiments, the system is configured to utilize recycled PET of varying quality in the process described above. For example, in various embodiments, the system is configured to produce bulked continuous carpet filament from PET derived from PET bottles sourced from curbside recycling sources (e.g., PET bottles that were collected as part of a general bulk recycling program or other recycling source) as well as deposit PET bottles (e.g., bottles returned as part of a deposit program). In various embodiments, Curbside recycled bottles may require more thorough processing in order to produce bulked continuous filament, as curbside recycled PET bottles may be mixed in with and otherwise include contaminants such as, for example: other recyclable goods (e.g., paper, other plastics, etc.), garbage, and other non-PET bottle items due to imperfect sorting of recycled goods or for any other reason. Deposit PET bottles may include PET bottles with fewer unwanted contaminants due in part because deposit PET bottles may be collected separately from other recyclable or disposable goods.

In various embodiments, curbside recycled PET bottles acquired during particular times of year may include more impurities and other contaminants than at other times of the year. For example, curbside recycled PET bottles collected during summer months may comprise a higher percentage of clear PET bottles (e.g., water bottles) at least in part due to additional water consumption during summer months.

In various embodiments, the system described above may be configured to adjust particular components of the process based at least in part on the source of recycled PET being used to produce the bulked continuous carpet filament. For example, because deposit PET bottles include fewer impurities that need to be removed during the initial cleaning and sorting phases of the process, the pressure regulation system may be configured to maintain a pressure within the MRS extruder that is higher than a pressure that it would be configured to maintain for PET flake derived from curbside recycled PET bottles. In a particular embodiment, the pressure regulation system may be configured to maintain a pressure within the MRS extruder of between about 0 millibars and about 12 millibars when flakes derived from deposit PET bottles are passing through the MRS extruder. In still other embodiments, the pressure regulation system may be configured to maintain a pressure within the MRS extruder of between about 5 millibars and about 10 millibars in such instances.

In various embodiments, the system is configured to determine a suitable pressure at which to maintain the pressure within the MRS extruder based at least in part on the source of the recycled PET. In other embodiments, the system is configured to omit one or more of the steps above or include one or more additional steps to the steps described above based at least in part on the source of the recycled PET.

The Use of Colored PET and Color Additives

In various embodiments, systems for manufacturing recycled bulked continuous filament described above may utilize colored (non-clear) post-consumer PET bottles (e.g., or other containers) in addition to the clear PET bottles described elsewhere herein. For example, in particular embodiments, the system may utilize blue, green, amber or any other suitable colored bottles in the production of recycled BCF (e.g., rather than removing substantially all of the colored PET from the recycled PET in the initial stages of the process). In certain embodiments, the process includes one or more additional steps that include, for example, adding one or more color additives (e.g., one or more solution dye color concentrates), which may, for example, dilute a discoloration of the resulting recycled fiber caused by using colored PET in the recycling process.

Flake Color Ratios

In various embodiments, the PET bottles used in the production of recycled BCF may include particular percentages of clear and colored bottles (e.g., by volume, by mass, etc.). For example, in particular embodiments, recycled BCF may be produced using at least about 80% (e.g., 80%) clear bottles and no more than about 20% (e.g., 20%) colored bottles. In particular embodiments, the colored bottles that the system uses along with clear bottles to produce the recycled BCF may include only recycled bottles of a particular color (e.g., only green bottles, only blue bottles, only amber bottles, etc.). In particular embodiments, the system may be configured to use bottles of a particular shade of a particular color. For example, in various embodiments, the system may be configured to utilize lighter blue bottles (e.g., bottles of a particular light shade of blue) but not to use darker blue bottles. In still other embodiments, the system may be configured to use any suitable colored bottles (e.g., or other sources of recycled PET) in any suitable ratio.

In various embodiments, the process may utilize between about 6.5 percent (e.g., 6.5 percent) and about nine percent (e.g., nine percent) colored PET with the remainder being clear PET. In other embodiments, the process may use between about six and about ten percent colored PET. In still other embodiments, the process may use up to about ten percent colored PET with balance substantially clear PET. In still other embodiments, the process may utilize between about one percent colored PET and about ten percent colored PET with balance substantially clear PET. In other embodiments, the process may use any other suitable ratio of colored recycled PET to clear recycled PET.

Use of Colored Flake Based on Desired Carpet Color

In various embodiments, an amount of non-clear PET bottles used in the process may be based at least in part on a color of carpet into which the recycled BCF produced by the process will ultimately be made. For example, for darker carpets, the recycled BCF used in their creation may be produced using a higher percentage of colored (e.g., non-clear) PET bottles. In various embodiments, the use of a higher percentage of colored PET bottles may result in darker recycled BCF filament, which may, for example, be unsuitable for the production of particular colored carpets (e.g., lighter carpets). Carpets which will ultimately be dyed in darker colors (e.g., or solution dyed into a darker color) may be more suitable for production using recycled BCF produced at least partially from colored PET bottles. For example, the production of recycled BCF for use in brown carpets may utilize at least a particular amount of amber PET bottles in the recycling process (e.g., 20% amber and 80% clear, or any other suitable ratio).

In a particular example, the system may use 2% or less of non-clear PET bottles in the process when producing relatively light-colored BCF. This may help to reduce or eliminate the need to use offsetting color concentrate (as discussed in greater detail below) to achieve the desired light-colored BCF.

In certain situations, it may be advantageous to use high percentages of non-clear PET bottles since doing so may reduce the amount of solution dye needed to achieve the desired color. For example, it may be advantageous to use over about 80%, over about 90%, over about 95%, or about 100% non-clear PET in using the process to produce certain dark-colored (or other colored) recycled BCF. For example, in various embodiments, it may be advantageous to use over 95% non-clear PET in producing dark-green recycled BCF since doing so may reduce the amount of solution dye needed to attain the desired dark-green color.

In various embodiments, it may be acceptable to use the percentages of non-clear PET that are commonly available in purchased lots of curbside recycled bottles. Such percentages typically range from between about 6.5% to 9.5% non-clear PET. In particular situations, where such ranges are acceptable, the system is adapted not to sort non-clear PET from clear PET. Rather, non-clear and clear PET are processed and used together. However, non-PET polymers may be separated from the mix and discarded as described above.

Use of Offsetting Color Concentrate with Colored PET

In particular embodiments, the system is configured to use any suitable solution dyeing technique to at least partially offset (e.g., substantially offset) any discoloration of the BCF filament resulting from the above process when utilizing colored recycled PET. In various embodiments, the system is configured to add a color concentrate to polymer flakes prior to extrusion (e.g., or to polymer melt during or after extrusion) in order to at least partially offset a coloration of the resultant filament due to the use of colored recycled PET. In particular embodiments, the color concentrate may include any suitable color concentrate, which may, for example, result in a particular color of polymer fiber (e.g., bulked continuous filament) following extrusion. In various embodiments, adding color concentrate to the flakes prior to extrusion may result in polymer filament that is at least partially impregnated (e.g., impregnated) with a color pigment. In various embodiments, the impregnated color pigment may offset any discoloration of the resulting fiber that may have resulted due to the use of colored recycled PET in the extrusion process. In particular embodiments, carpet produced from solution dyed filament may be highly resistant to color loss through fading from sunlight, ozone, harsh cleaning agents such as bleach, or other factors.

In various embodiments, the color concentrate includes any suitable dispersion of color in a compatible carrier. In some embodiments, color concentrates are designed so that, when added to a natural resin (e.g., PET) in a set proportion, they color the resin substantially evenly (e.g., evenly) to match a desired color. In some embodiments, the color may comprise mixtures of pigments, which may, for example, include particles of insoluble colored material, in the resin. In other embodiments, color concentrates may include one or more polymer-soluble dyes that are suitable alone or in combination with one or more pigments.

In particular embodiments, the system is configured to add between about two percent (e.g., two percent) and about three percent (e.g., three percent) color concentrate by mass to the polymer flake. In other embodiments, the system is configured to add between about zero percent (e.g., zero percent) and about three percent (e.g., three percent) color concentrate by mass or volume. In still other embodiments, the system is configured to add up to about six percent (e.g., six percent) color concentrate by mass to the polymer flake prior to extrusion. In some embodiments, the system is configured to add between about one percent (e.g., one percent) and about three percent (e.g., three percent) color concentrate by mass to the polymer flake. In still other embodiments, the system is configured to add any suitable ratio of color concentrate to polymer flake in order to achieve a particular color of molten polymer (and ultimately polymer fiber) following extrusion.

FIG. 4 depicts an embodiment in which color concentrate is added to the polymer flake (e.g., mix of colored and clear PET flake) prior to feeding the flake through the first single-screw extruder section 410. It should be understood that, in other embodiments, the color concentrate may be added during any other suitable phase of the process described in this document. For example, in various embodiments, such as any of the examples discussed above, the system may be configured to add the color concentrate following extrusion of the polymer flake by the first single-screw extruder section 410 but prior to feeding the resultant polymer melt through the extruder's MRS section 420 discussed herein. In still other embodiments, the system may add the color concentrate after the flake has passed through the MRS extruder's MRS section 420 prior to passing the polymer melt through the second single screw section 440 discussed herein. In still other embodiments, the system may add the color concentrate while the flakes and/or polymer melt are being extruded in the first single-screw extruder section 410, MRS Section 420, second single screw section 440, or at any other suitable phase of the process. In still other embodiments, the system may add the color concentrate during one or more (e.g., a plurality) of the phases of the process described herein (e.g., the system may add some color concentrate to the polymer flake prior to passing the flake through the single-screw extruder section 410 and some additional solution color concentrate following extrusion through the MRS Section 420).

In various embodiments, the use of a color concentrate at least partially masks any coloration of the resulting in a bulked continuous filament created using the above process using colored recycled PET. In such embodiments, the resulting bulked continuous filament may have a color that is substantially similar to a color of bulked continuous filament produced using substantially only substantially clear (e.g., clear) recycled PET and a color concentrate.

Substantially Automated Solution Dyeing

In various embodiments, the system is configured to substantially automatically adjust an amount of color concentrate added to the polymer flake and/or polymer melt in order to produce a desired color of BCF filament. In various other embodiments, the system is configured to substantially automatically determine an amount of color concentrate to add to the colored PET to sufficiently offset the color of the colored PET. In such embodiments, the system may, for example, use a suitable feedback loop that includes: (1) determining a color of bulked continuous filament produced by the process; (2) determining whether the color is acceptable (e.g., the color is determined to be a particular target color and/or the color is determined to meet one or more pre-determined color guidelines); and (3) substantially automatically adjusting an amount of color concentrate being added to the colored PET upstream based at least in part on the determined color (whether the determined color is acceptable according to one or more pre-determined color guidelines). In particular embodiments, the system is adapted to automatically adjust an amount of color concentrate being added to the colored (non-clear) PET to assure that it is sufficient for the resulting colored PET to satisfy the one or more pre-determined color guidelines.

Non-Solution Dyeing to Mask Colored PET in Resultant Filament

In various embodiments, the process may utilize any suitable dyeing technique other than the solution dyeing technique described above to at least partially mask a coloration of the filament produced using the recycled BCF process described herein with colored recycled PET. For example, in various embodiments, the process may utilize any suitable skein dyeing technique, any suitable continuous dyeing technique, any suitable space dyeing technique, any suitable beck dyeing technique, or any other suitable dyeing technique or suitable combination of dyeing techniques.

Mixing of PTT with PET to Increase Dyeability

In various embodiments, such as embodiments in which the process includes adding one or more solution dyes to recycled PET that includes colored PET, the process may include adding polytrimethylene terephthalate (PTT) (or any other suitable additive) to the PET prior to extrusion, during extrusion, along with the color concentrate, separately from the color concentrate, or at any other suitable time. In various embodiments, the mixture of PTT (or other additive) and PET may have an enhanced dyeability compared to PET that has not been mixed with PTT. In particular embodiments, the process includes using a mixture of between about five percent (e.g., five percent) and about fourteen percent (e.g., fourteen percent) PTT (or other additive) in the mixture by mass or volume. In other embodiments, the process includes using a mixture of between about six percent (e.g., six percent) and about ten percent (e.g., ten percent) PTT (or other additive) in the mixture by mass or volume. In still other embodiments, the process includes adding up to about fourteen percent (e.g., fourteen percent) PTT (or other additive) by volume or mass (e.g., between about zero percent and about fourteen percent PTT). In various embodiments, the addition of PTT (or other additive) to the PET may reduce a cost of dyeing the resulting fiber.

In various embodiments, the process may utilize virgin PTT. In still other embodiments, the process may utilize recycled PTT. In some embodiments, PTT may be recycled from any suitable source such as, for example, recycled PTT carpet, recycled food containers, and/or other suitable PTT products. In various embodiments, the PTT may include recycled PTT recovered (e.g., recycled) using the process described herein.

In various embodiments, the above process may be suitable for recycling PTT for use in mixing the recycled PTT (or other suitable additive) with PET to improve dyeability of the PET due to the similar chemical composition of PTT and PET. The resulting combination may have a higher durability and resilience than conventional polyesters (e.g., PET). In particular embodiments, PTT is particularly useful in the production of carpet due to PTT's stain-resistant qualities. PTT carpets may, for example, at least generally maintain their original appearance through simple vacuuming and hot water extraction. This may, for example, result in a longer lifespan of carpet produced with PTT. In particular embodiments, PTT is substantially hydrophobic, which may contribute to PTT carpet's stain resistance. In various embodiments, PTT carpeting is also substantially soft (e.g., to the touch). PTT carpet's softness may result from, for example, a lack of topically-applied chemicals for stain protection due to PTT's inherent hydrophobic tendencies. It should be understood, based on the above discussion, that any suitable additive may be used in place of, or in addition to, PTT in the examples discussed above.

Addition of Dye Enhancers

In various embodiments, such as embodiments in which the process includes adding one or more dye enhancers to recycled PET that includes non-clear PET, the process may include adding DEG (or any other suitable dye enhancer) to the PET prior to extrusion, during extrusion, along with color concentrate, separately from color concentrate, or at any other suitable time. In various embodiments, the mixture of the dye enhancer and PET may have an enhanced dyeability compared to PET that has not been mixed with the dye enhancer. In particular embodiments, the process includes using a mixture of between about zero percent (e.g., zero percent) and about five percent (e.g., five percent) dye enhancer (e.g., DEG) in the mixture by mass or volume. In certain embodiments, the process includes using a mixture of between about one percent (e.g., one percent) and about two percent (e.g., two percent) dye enhancer (e.g., DEG) in the mixture by mass or volume.

CONCLUSION

Many modifications and other embodiments of the invention will come to mind to one skilled in the art to which this invention pertains having the benefit of the teachings presented in the foregoing descriptions and the associated drawings. For example, although the vacuum system discussed above is described as being configured to maintain the pressure in the open chambers of the MRS extruder to about 1 mbar, in other embodiments, the vacuum system may be adapted to maintain the pressure in the open chambers of the MRS extruder at pressures greater than, or less than, 1 mbar. For example, the vacuum system may be adapted to maintain this pressure at between about 0.5 mbar and about 12 mbar.

Similarly, although various embodiments of the systems described above may be adapted to produce carpet filament from substantially only recycled PET (so the resulting carpet filament would comprise, consist of, and/or consist essentially of recycled PET), in other embodiments, the system may be adapted to produce carpet filament from a combination of recycled PET and virgin PET. The resulting carpet filament may, for example, comprise, consist of, and/or consist essentially of between about 80% and about 100% recycled PET, and between about 0% and about 20% virgin PET.

Furthermore, it should be understood that when ratios of polymers are discussed herein (e.g., as a percentage) such as a ratio of colored recycled PET to clear recycled PET, color concentrate to polymer flake, etc., the percentages may include a percentage by volume, a percentage by mass, a percentage by weight, or any other suitable relative measure.

Also, while various embodiments are discussed above in regard to producing carpet filament from PET, similar techniques may be used to produce carpet filament from other polymers. Similarly, while various embodiments are discussed above in regard to producing carpet filament from PET, similar techniques may be used to produce other products from PET or other polymers.

In addition, it should be understood that various embodiments may omit any of the steps described above or add additional steps.

In light of the above, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A method of manufacturing bulked continuous carpet filament, the method comprising:
    (A) providing an extrusion system that comprises:
        (i) a first extruder;
        (ii) a second extruder; and
        (iii) a pressure regulation system that is adapted to maintain a pressure within the first and second extruders between about 0 millibars and about 5 millibars;
    (B) using the pressure regulation system to reduce a pressure within the first and second extruders to between about 0 millibars and about 5 millibars;
    (C) providing a plurality of polymer flakes, the plurality of polymer flakes comprising between about six percent and about ten percent colored recycled polyethylene terephthalate (PET) flakes and balance substantially clear recycled PET flakes;
    (D) providing one or more color additives;
    (E) adding the one or more color additives to the plurality of polymer flakes such that the resulting mixture comprises between about zero percent and about three percent of the one or more color additives by weight;
    (F) while maintaining the pressure within the first and second extruders between about 0 millibars and about 5 millibars, passing the plurality of polymer flakes and the one or more color additives through the extrusion system to form a polymer melt so that: (1) a first portion of the polymer melt passes through the first extruder, and (2) a second portion of the polymer melt passes through the second extruder; and
    (G) after the step of passing the polymer melt through the extrusion system, forming the recycled polymer into bulked continuous carpet filament.

2. The method of claim 1, wherein the colored recycled PET flakes consist essentially of colored PET flakes derived from recycled PET bottles.

3. The method of claim 2, wherein the colored recycled PET flakes comprise one or more types of PET flake selected from a group consisting of:
    i. amber PET flake;
    ii. blue PET flake; and
    iii. green PET flake.

4. The method of claim 1, further comprising:
    providing a color sensor configured to determine a color of the polymer melt; and
    substantially automatically adjusting an amount of the one or more color additives added to the plurality of polymer flakes based at least in part on the determined color of the polymer melt.

5. The method of claim 4, wherein the plurality of polymer flakes comprises:
    between about six percent and about ten percent colored recycled PET flakes by weight;
    up to about six percent polytrimethylene terephthalate (PTT) by weight; and
    balance substantially clear recycled PET flakes.

6. The method of claim 5, wherein the plurality of polymer flakes comprises:
    between about seven percent and about nine percent colored recycled PET flakes by weight;
    between about five percent and about six percent PTT by weight; and
    balance substantially clear recycled PET flakes.

7. The method of claim 1, wherein the one or more color additives at least partially offset a coloration of the bulked continuous carpet filament from the colored recycled PET flakes.

8. The method of claim 1, wherein the one or more color additives comprise a solution dye concentrate.

9. The method of claim 1, wherein the extrusion system is one of a twin screw extruder, a multiple screw extruder, or a planetary extruder.

10. A method of manufacturing carpet filament from clear and colored recycled PET bottles comprising the steps of:

(A) providing a plurality of recycled PET bottles;
(B) grinding the plurality of recycled PET bottles into a group of polymer flakes, the group of polymer flakes comprising up to about ten percent colored polymer flakes and balance substantially clear polymer flakes;
(C) washing the group of polymer flakes;
(D) providing a color additive;
(E) mixing the color additive with the group of polymer flakes to form a color additive-polymer mixture comprising up to about three percent color additive by weight;
(F) melting the color additive-polymer mixture to produce a polymer melt;
(G) providing an extruder that extrudes material in a plurality of different extrusion streams;
(H) reducing a pressure within the extruder to between about 0 millibars and about 12 millibars;
(I) while maintaining the pressure within the extruder between about 0 millibars and about 12 millibars, passing the polymer melt through the extruder so that the polymer melt is divided into a plurality of extrusion streams, each having a pressure between about 0 millibars and about 12 millibars;
(J) after passing the polymer melt through the extruder, filtering the polymer melt through at least one filter; and
(K) after passing the polymer melt through the filter, forming the polymer melt into bulked continuous carpet filament.

11. The method of claim 10, the method further comprising:
providing polytrimethylene terephthalate (PTT); and
adding the PTT to the color additive-polymer mixture, such that the color additive-polymer mixture comprises:
up to about three percent color additive by weight;
up to about six percent PTT by weight; and
balance the group of polymer flakes.

12. The method of claim 11, wherein adding the PTT to the color additive-polymer mixture increases the dyeability of the resultant color additive-polymer mixture.

13. The method of claim 12, the method further comprising adding the PTT to the color additive-polymer mixture, such that the color additive-polymer mixture comprises:
between about two percent and about three percent color additive by weight;
between about five percent and about six percent PTT by weight; and
balance the group of polymer flakes.

14. The method of claim 10, the method further comprising:
providing one or more color sensors configured to determine a color of the polymer melt; and
substantially automatically adjusting an amount of the color additive added to the color additive-polymer mixture based at least in part on the determined color of the polymer melt.

15. The method of claim 14, wherein the one or more color sensors comprise one or more color sensors selected from a group consisting of:
one or more cameras; and
one or more spectrographs.

16. The method of claim 10, wherein the color additive at least partially masks a coloration of the bulked continuous carpet filament caused by the colored polymer flakes.

17. A method of manufacturing bulked continuous carpet filament, the method comprising:

(A) providing an extrusion system that comprises:
(i) a first extruder;
(ii) a second extruder;
(iii) a third extruder;
(iv) a fourth extruder; and
(v) a pressure regulation system that is adapted to maintain a pressure within the first, second, third, and fourth extruders between about 1 millibar and about 18 millibars;
(B) using the pressure regulation system to reduce a pressure within the first, second, third, and fourth extruders to between about 0 millibars and about 18 millibars;
(C) while maintaining the pressure within the first, second, third, and fourth extruders between about 1 millibar and about 18 millibars, passing a polymer melt through the extrusion system so that: (1) a first portion of the melt passes through the first extruder, (2) a second portion of the melt passes through the second extruder, (3) a third portion of the melt passes through the third extruder, and (4) a fourth portion of the melt passes through the fourth extruder, wherein:
the polymer melt comprises:
between about seven percent and about nine percent colored recycled PET by weight;
between about two percent and about three percent color additive by weight; and
balance recycled substantially clear PET; and
(D) after the step of passing the polymer melt through the extrusion system, forming the polymer melt into bulked continuous carpet filament.

18. The method of claim 17, further comprising:
providing one or more color sensors configured for determining a color of the polymer melt;
using the one or more color sensors to determine the color of the polymer melt;
determining whether the color is a desired color;
at least partially in response to determining that the color is not a desired color, taking an action selected from a group consisting of:
increasing an amount of color additive in said polymer melt; and
decreasing an amount of color additive in said polymer melt.

19. The method of claim 17, wherein the polymer melt comprises:
between about seven percent and about nine percent colored recycled PET by weight;
up to about five percent PTT by weight;
between about two percent and about three percent color additive by weight; and
balance recycled substantially clear PET.

20. The method of claim 17, wherein the color additive at least partially masks a coloration of the bulked continuous carpet filament caused by the colored recycled PET.

21. The method of claim 20, wherein the bulked continuous carpet filament has a color that is substantially the same as a color of bulked continuous carpet filament produced substantially only from recycled substantially clear PET.

22. The method of claim 17, wherein the colored recycled PET is derived essentially from recycled PET bottles having a color selected from a group consisting of:
i. amber;
ii. blue; and
iii. green.

* * * * *